United States Patent
Liu et al.

(10) Patent No.: US 12,193,046 B2
(45) Date of Patent: Jan. 7, 2025

(54) METHOD AND DEVICE IN NODES USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 428 days.

(21) Appl. No.: 17/524,754

(22) Filed: Nov. 12, 2021

(65) Prior Publication Data

US 2022/0116958 A1 Apr. 14, 2022

Related U.S. Application Data

(63) Continuation of application No. PCT/CN2020/091089, filed on May 19, 2020.

(30) Foreign Application Priority Data

Jun. 5, 2019 (CN) .......................... 201910485795.2

(51) Int. Cl.
*H04W 72/566* (2023.01)
*H04W 72/23* (2023.01)
*H04W 74/00* (2009.01)

(52) U.S. Cl.
CPC .......... *H04W 72/569* (2023.01); *H04W 72/23* (2023.01); *H04W 74/006* (2013.01)

(58) Field of Classification Search
CPC .......... H04L 1/18; H04L 1/1812; H04W 4/40; H04W 28/04; H04W 28/26; H04W 72/02;
(Continued)

(56) References Cited

U.S. PATENT DOCUMENTS 7,647,541 B2 * 1/2010 Terry .................... H04W 72/23
714/749
8,621,310 B2 * 12/2013 Terry .................... H04L 1/1812
714/749
(Continued)

FOREIGN PATENT DOCUMENTS

AU 2018237381 B2 * 9/2020 ........... H04B 17/382
BR 112019019787 A2 * 4/2020 ........... H04B 17/382
(Continued)

OTHER PUBLICATIONS

ISR received in application No. PCT/CN2020/091089 dated Aug. 18, 2020.
(Continued)

*Primary Examiner* — Eric Nowlin

(57) ABSTRACT

A method and a device in nodes used for wireless communications are disclosed in the present disclosure. A first node receives a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied. The present disclosure improves the success rate of correct reception of retransmitted data, thereby ensuring the requests for delay in sidelink transmission.

16 Claims, 6 Drawing Sheets

(58) Field of Classification Search
CPC ... H04W 72/044; H04W 72/23; H04W 72/53; H04W 72/56; H04W 72/569; H04W 74/006

See application file for complete search history.

(56) References Cited

U.S. PATENT DOCUMENTS

| | | | | |
|---|---|---|---|---|
| 9,209,944 | B2* | 12/2015 | Terry | H04L 1/08 |
| 9,913,289 | B2* | 3/2018 | Terry | H04L 1/1812 |
| 10,251,158 | B2* | 4/2019 | Gulati | H04B 17/382 |
| 10,595,333 | B2* | 3/2020 | Terry | H04L 1/1877 |
| 10,887,736 | B2* | 1/2021 | Lee | H04W 72/542 |
| 11,025,374 | B2* | 6/2021 | Guo | H04L 1/1822 |
| 11,134,508 | B2* | 9/2021 | Zhang | H04W 72/56 |
| 11,576,148 | B2* | 2/2023 | Lee | H04W 72/56 |
| 11,678,302 | B2* | 6/2023 | Hui | H04W 74/0808 370/329 |
| 11,716,752 | B2* | 8/2023 | Lee | H04W 72/02 370/329 |
| 11,871,445 | B2* | 1/2024 | Zhang | H04W 72/23 |
| 12,047,917 | B2* | 7/2024 | Hui | H04W 72/02 |
| 2005/0251722 | A1* | 11/2005 | Terry | H04L 1/1887 714/749 |
| 2010/0115368 | A1* | 5/2010 | Terry | H04L 1/1816 714/748 |
| 2014/0079039 | A1* | 3/2014 | Terry | H04L 1/1887 370/336 |
| 2016/0088650 | A1* | 3/2016 | Terry | H04W 72/23 370/329 |
| 2017/0054540 | A1* | 2/2017 | Kim | H04L 5/0033 |
| 2017/0230939 | A1* | 8/2017 | Rudolf | H04W 72/569 |
| 2017/0295567 | A1* | 10/2017 | Chen | H04W 4/70 |
| 2017/0332390 | A1* | 11/2017 | Li | H04L 5/16 |
| 2018/0263051 | A1* | 9/2018 | Terry | H04L 1/1816 |
| 2018/0279259 | A1* | 9/2018 | Gulati | H04L 5/0071 |
| 2019/0044667 | A1* | 2/2019 | Guo | H04L 1/1822 |
| 2019/0116475 | A1* | 4/2019 | Lee | H04W 4/40 |
| 2020/0045724 | A1* | 2/2020 | Lu | H04W 72/569 |
| 2020/0154458 | A1* | 5/2020 | Zhang | H04W 72/23 |
| 2020/0178217 | A1* | 6/2020 | Huang | H04W 76/27 |
| 2020/0195389 | A1* | 6/2020 | Basu Mallick | H04W 4/70 |
| 2020/0288431 | A1* | 9/2020 | Lee | H04W 56/0015 |
| 2021/0377969 | A1* | 12/2021 | Zhang | H04W 72/02 |
| 2022/0053496 | A1* | 2/2022 | Yu | H04L 1/1896 |
| 2022/0116958 | A1* | 4/2022 | Liu | H04W 72/23 |
| 2022/0322304 | A1* | 10/2022 | Hui | H04W 72/02 |
| 2023/0083277 | A1* | 3/2023 | Lee | H04W 72/0446 370/329 |
| 2023/0239839 | A1* | 7/2023 | Hui | H04W 74/0808 370/329 |
| 2023/0284257 | A1* | 9/2023 | Hui | H04W 72/563 370/329 |
| 2023/0345520 | A1* | 10/2023 | Lee | H04W 72/02 |
| 2023/0354376 | A1* | 11/2023 | Chae | H04W 72/563 |

FOREIGN PATENT DOCUMENTS

| | | | | |
|---|---|---|---|---|
| CA | 3054944 | A1 * | 9/2018 | H04B 17/382 |
| CA | 3054944 | C * | 9/2022 | H04B 17/382 |
| CA | 2957406 | C * | 10/2023 | H04L 12/1863 |
| CN | 105101430 | A * | 11/2015 | H04W 4/70 |
| CN | 107733555 | A | 2/2018 | |
| CN | 108024230 | A | 5/2018 | |
| CN | 108632782 | A | 10/2018 | |
| CN | 109526247 | A | 3/2019 | |
| CN | 109891985 | A * | 6/2019 | H04L 43/16 |
| CN | 110521255 | A * | 11/2019 | H04B 17/382 |
| CN | 111316585 | A * | 6/2020 | H04L 1/1628 |
| CN | 112055385 | A * | 12/2020 | H04L 1/1812 |
| CN | 112055385 | B * | 3/2022 | H04L 1/1812 |
| CN | 110521255 | B * | 11/2022 | H04B 17/382 |
| CN | 111316585 | B * | 8/2023 | H04L 1/1628 |
| CN | 117204082 | A * | 12/2023 | H04W 28/26 |
| EP | 3603246 | B1 * | 5/2021 | H04B 17/382 |
| EP | 3439416 | B1 * | 7/2021 | H04W 4/40 |
| EP | 3616349 | B1 * | 2/2022 | H04L 1/1628 |
| ES | 2874049 | T3 * | 11/2021 | H04B 17/382 |
| WO | WO-2015169148 | A1 * | 11/2015 | H04W 4/70 |
| WO | 2018058594 | A1 | 4/2018 | |
| WO | WO-2018175822 | A1 * | 9/2018 | H04B 17/382 |
| WO | 2018201448 | A1 | 11/2018 | |
| WO | 2019027304 | A1 | 2/2019 | |
| WO | 2019028900 | A1 | 2/2019 | |
| WO | WO-2020244383 | A1 * | 12/2020 | H04L 1/1812 |
| WO | WO-2022125886 | A1 * | 6/2022 | H04W 28/26 |
| WO | WO-2022155209 | A1 * | 7/2022 | H04B 17/328 |

OTHER PUBLICATIONS

CN201910485795.2 Notification to Grant Patent Right for Invention dated Jan. 21, 2022.

CN201910485795.2 First Office Action dated Sep. 3, 2021.

CN201910485795.2 First Search Report dated Aug. 26, 2021.

Huawei et al. "Correction on V2X sidelink communication in TS 36.300" 3GPP TSG-RAN WG2 Meeting #104 R2-1816470, Oct. 16, 2018 (Oct. 16, 2018).

MediaTek Inc"Discussion on physical layer structure for NR layer structure for NR" 3GPP TSG RAN WG1 Meeting #95 R1-1812364, Nov. 16, 2018.

\* cited by examiner

METHOD AND DEVICE IN NODES USED FOR WIRELESS COMMUNICATION

CROSS REFERENCE TO RELATED APPLICATIONS

This application is a continuation of International Application No. PCT/CN2020/091089, filed May 19, 2020, claims the priority benefit of Chinese Patent Application No. 201910485795.2, filed on Jun. 5, 2019, the full disclosure of which is incorporated herein by reference.

BACKGROUND

Technical Field

The present disclosure relates to transmission methods and devices in wireless communication systems, and in particular to a sidelink-related transmission scheme and device in wireless communications.

Related Art

As application scenarios for wireless communication systems become increasingly diverse, different performance requirements have been put forward over the systems. To meet these various performance requirements, the 3rd Generation Partner Project (3GPP) Radio Access Network (RAN) #72 Plenary decided to study New Radio (NR), or what is called the Fifth Generation (5G), and later at the 3GPP RAN #75 Plenary, a Work Item (WI) was approved to standardize NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The NR-based V2X technical research has already been started at the 3GPP RAN #80 Plenary and an agreement was reached at the first AdHoc Conference of RAN1 2019 to take the pathloss in a transmitter and a receiver in a V2X pair as a reference for V2X transmit power.

SUMMARY

Compared with the current LTE V2X system, an outstanding feature of NR V2X is the capability of supporting groupcast and unicast as well as the functionality of Hybrid Automatic Repeat Request (HARQ). In a traditional V2X system, when the sidelink is working in a mode of resource selection, initial transmission and retransmission are performed together, therefore, there will be no need to distinguish the initial transmission from the retransmission when reserving resources; by contrast, the V2X system already supports a retransmission based on HARQ feedback and reserves resources separately for the initial transmission and retransmission. Too many retransmissions will inevitably lead to a greater transmission delay.

To address the above problem, the present disclosure provides a scheme of sidelink resource sensing to effectively handle the delay resulting from multiple retransmissions in sidelink. It should be noted that the embodiments of a User Equipment (UE) and the characteristics in the embodiments may be applied to a base station, and vice versa. In the case of no conflict, the embodiments of the present disclosure and the characteristics in the embodiments may be combined with each other arbitrarily. Furthermore, though originally targeted at single-carrier communications, the present disclosure is also applicable to multi-carrier communications. And the present disclosure not only is targeted at single-antenna communications, but also can be applied in multi-antenna communications.

The present disclosure provides a method in a first node for wireless communications, comprising:

receiving a first signaling, the first signaling being used to indicate a first priority, a first parameter and a first radio resource block;

herein, the first parameter is used to indicate whether the first radio resource block is to be reserved for an initial transmission, and the first priority and the first parameter are jointly used to determine whether the first radio resource block can be occupied.

In one embodiment, a problem to be solved in the present disclosure is the degradation of transmission delay in a case of occupancy of retransmission resources due to excessive retransmissions.

In one embodiment, the method proposed in the present disclosure is to lift the priority of retransmission resources to a higher level, apart from considering the traffic priority, thus making it less likely to occupy retransmission resources, as a result, the success rate of retransmission can be increased, and delay will be reduced.

In one embodiment, the above method is characterized in that the first parameter is used to indicate whether the first radio resource block is to be reserved for an initial transmission.

In one embodiment, the above method is characterized in that an association is created between the first signaling and the first radio resource block.

In one embodiment, the above method is characterized in that the first radio resource block is associated with whether it is to be reserved for an initial transmission.

In one embodiment, the above method is characterized in that whether the first radio resource block is to be reserved for an initial transmission is used to determine whether the first radio resource block can be occupied.

In one embodiment, the above method is characterized in that the occupancy threshold for the first radio resource block is adjusted according to whether the first radio resource block is to be reserved for an initial transmission or a retransmission.

In one embodiment, the above method is advantageous in enhancing the success rate of correct reception of retransmitted data, thereby ensuring the request for delay in sidelink transmission.

According to one aspect of the present disclosure, the above method is characterized in comprising:

determining a first advancement priority;

herein, the first advancement priority is linear with the first priority and a first priority offset; the first parameter is used to determine the first priority offset; the first advancement priority is used to determine a first threshold.

According to one aspect of the present disclosure, the above method is characterized in comprising:

determining a first threshold offset;

herein, the first threshold is linear with a first reference threshold and a first threshold offset; the first priority is used to determine the first reference threshold, and the first parameter is used to determine the first threshold offset.

According to one aspect of the present disclosure, the above method is characterized in comprising:

receiving first configuration information, the first configuration information being used to indicate a second priority;

herein, the first priority and the second priority are jointly used to determine the first threshold; the first threshold is used to determine whether the first radio resource block can be occupied.

According to one aspect of the present disclosure, the above method is characterized in comprising:

transmitting a second radio signal on the first radio resource block in cases when the first radio resource block can be occupied.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:

transmitting a first signaling, the first signaling being used to indicate a first priority, a first parameter and a first radio resource block;

herein, the first parameter is used to indicate whether the first radio resource block is to be reserved for an initial transmission, and the first priority and the first parameter are jointly used to determine whether the first radio resource block can be occupied.

According to one aspect of the present disclosure, the above method is characterized in that a first advancement priority is used to determine a first threshold; the first advancement is linear with the first priority and the first priority offset; the first parameter is used to determine the first priority offset.

According to one aspect of the present disclosure, the above method is characterized in that a first threshold is linear with a first reference threshold and a first threshold offset; the first priority is used to determine the first reference threshold; the first parameter is used to determine the first threshold offset.

According to one aspect of the present disclosure, the above method is characterized in that the first priority and the second priority are jointly used to determine the first threshold; the first threshold is used to determine whether the first radio resource block can be occupied; the second priority is indicated by first configuration information.

According to one aspect of the present disclosure, the above method is characterized in comprising:

transmitting a first radio signal on the first radio resource block;

herein, a first bit block is used to generate the first radio signal; the first parameter indicates whether the first radio signal is an initial transmission of the first bit block.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communications, comprising:

a first receiver, receiving a first signaling;

herein, the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

The present disclosure provides a second node for wireless communications, comprising:

a second transmitter, transmitting a first signaling;

herein, the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the present disclosure has the following advantages:

- by improving the priority of retransmission resources, the retransmission resources are becoming less easily occupied, thus guaranteeing the success rate of retransmission, and reducing delay.
- association between the first signaling and the first radio resource block will be created.
- whether the first radio resource block in the present disclosure is to be reserved for an initial transmission is used to determine whether the first radio resource block can be occupied.
- according to whether the first radio resource block is to be reserved for an initial transmission or retransmission, the occupancy threshold for the first radio resource block will be adjusted.
- by enhancing the success rate of the retransmitted data being correctly received, the present disclosure ensures the requirements of delay for sidelink transmission.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
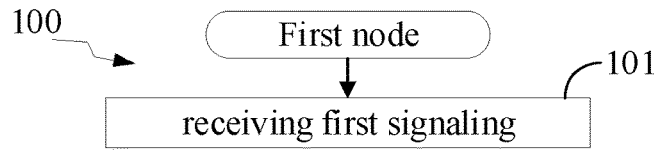
FIG. 1 illustrates a flowchart of processing of a first node according to one embodiment of the present disclosure.

Embodiment 1 illustrates a flowchart of processing of a first node, as shown in FIG. 1. In FIG. 1, each box represents a step. In Embodiment 1, a first node in the present disclosure performs step S101, to receive a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the first signaling is transmitted through a Physical Sidelink Control Channel (PSCCH).

In one embodiment, the first signaling is transmitted through a Physical Sidelink Shared Channel (PSSCH).

In one embodiment, the first signaling is transmitted through a PSCCH and a PSSCH.

In one embodiment, the first signaling is transmitted through a Physical Downlink Control Channel (PDCCH).

In one embodiment, the first signaling is transmitted through a Narrowband Physical Downlink Control Channel (NPDCCH).

In one embodiment, the first signaling is broadcast.

In one embodiment, the first signaling is groupcast.

In one embodiment, the first signaling is unicast.

In one embodiment, the first signaling is cell-specific.

In one embodiment, the first signaling is UE-specific.

In one embodiment, the first signaling is dynamically configured.

In one embodiment, the first signaling comprises one or more fields in a physical (PHY) layer signaling.

In one embodiment, the first signaling comprises one or more fields in a piece of Sidelink Control Information (SCI).

In one embodiment, the first signaling comprises one or more fields in a piece of Downlink Control Information (DCI).

In one embodiment, the first signaling is SCI.

In one embodiment, the first signaling only comprises SCI.

In one embodiment, the first signaling comprises one or more fields in a Configured Grant.

In one embodiment, the first signaling is the Configured Grant.

In one embodiment, for the definition of the Configured Grant, refer to 3GPP TS38.214, section 6.1.2.3.

In one embodiment, the first signaling comprises all or part of a Multimedia Access Control (MAC) layer signaling.

In one embodiment, the first signaling comprises one or more fields in a MAC Control Element (CE).

In one embodiment, the first signaling comprises all or part of a Higher Layer Signaling.

In one embodiment, the first signaling comprises all or part of a Radio Resource Control (RRC) layer signaling.

In one embodiment, the first signaling comprises one or more fields in a RRC Information Element (IE).

In one embodiment, the first signaling is used for transmission of scheduling information.

In one embodiment, the first signaling is used for transmission of Sidelink (SL) scheduling information.

In one embodiment, the first signaling is used for scheduling a Physical Sidelink Shared Channel (PSSCH).

In one embodiment, the first signaling is used for scheduling the first signal.

In one embodiment, the first signaling is used for scheduling to transmit the first signal on the first radio resource block.

In one embodiment, the first signaling comprises scheduling information of the first signal.

In one embodiment, the first signaling is used to request for transmitting the first signal.

In one embodiment, the first signaling is used to request for transmitting the first signal on the first radio resource block.

In one embodiment, the first signaling is used for transmission of trigger information.

In one embodiment, the first signaling is used to trigger transmitting the first signal.

In one embodiment, the first signaling is used to trigger transmitting the first signal on the first radio resource block.

In one embodiment, the first signaling is used to activate transmitting the first signal.

In one embodiment, the first signaling is used to activate transmitting the first signal on the first radio resource block.

In one embodiment, the first signal comprises a PSSCH.

In one embodiment, the first signal is transmitted on a PSSCH.

In one embodiment, the first signal comprises a Transport Block (TB).

In one embodiment, the first signal comprises a positive integer number of Code Block(s) (CB(s)).

In one embodiment, the first signal comprises a positive integer number of Code Block Group(s) (CBG(s)).

In one embodiment, the first signaling comprises Resource Reservation.

In one embodiment, for the definition of Resource Reservation, refer to 3GPP TS36.213, section 14.2.1.

In one embodiment, the first signaling comprises a position of frequency-domain resources.

In one embodiment, the first signaling comprises positions of frequency-domain resources for an initial transmission and a retransmission.

In one embodiment, for the definition of the position of frequency-domain resources, refer to 3GPP TS36.213, section 14.1.1.4C.

In one embodiment, the first signaling comprises a Time Gap between an initial transmission and a retransmission.

In one embodiment, for the definition of the Time Gap between the initial transmission and retransmission, refer to 3GPP TS36.213, section 14.1.1.4C.

In one embodiment, the first signaling comprises a Modulation and Coding Scheme (MCS).

In one embodiment, for the definition of the MCS, refer to 3GPP TS36.213, section 14.2.1.

In one embodiment, the first signaling comprises a Retransmission Index.

In one embodiment, for the definition of the Retransmission Index, refer to 3GPP TS36.213, section 14.2.1.

In one embodiment, the first signaling is used for indicating a Transmission format.

In one embodiment, the Transmission format comprises Rate-matching and Transport Block Size (TBS) Scaling.

In one embodiment, the Transmission format comprises Puncturing and TBS Scaling.

In one embodiment, the first signaling comprises a reservation information bit, and the reservation information bit is set to zero (0).

In one embodiment, the first signaling comprises a Hybrid Automatic Repeat request (HARQ) process number.

In one embodiment, the first signaling comprises a New Data Indicator (NDI).

In one embodiment, the first signaling comprises a Redundancy Version (RV).

In one embodiment, the first signaling is used for indicating a Layer-1 source identity.

In one embodiment, the first signaling is used for indicating a Layer-1 destination identity.

In one embodiment, the first signaling is used for indicating a Demodulation Reference Signal (DMRS).

In one embodiment, the first signaling is used for indicating an antenna port (AP).

In one embodiment, the first signaling comprises HARQ feedback indication.

In one embodiment, the first signaling comprises a Zone Identity (ID).

In one embodiment, the first signaling comprises a transmit (Tx) power.

In one embodiment, a Tx power of the first signaling is used to determine a Tx power of the first signal.

In one embodiment, the first signaling comprises a first priority.

In one embodiment, the first signaling comprises a positive integer number of first-type field(s), and a first field is one of the positive integer number of first-type field(s) comprised in the first signaling, the first field being used to indicate the first priority.

In one embodiment, the first field comprises a positive integer number of bit(s).

In one embodiment, the first field comprises 3 bits.

In one embodiment, the first priority is a non-negative integer.

In one embodiment, the first priority is a positive integer from 1 through 8.

In one embodiment, the first priority is an integer from 0 through 7.

In one embodiment, the first priority is used for V2X communications on a PC-5 interface.

In one embodiment, the first priority is a first-type priority of a positive integer number of first-type priorities.

In one embodiment, each V2X message corresponds to one of the positive integer number of first-type priorities.

In one embodiment, the first priority implicitly indicates a delay request of a V2X message corresponding to the first priority.

In one embodiment, the first priority implicitly indicates a traffic type of a V2X message corresponding to the first priority.

In one embodiment, the first priority is delivered from a higher layer of the first node to a MAC layer of the first node.

In one embodiment, the first priority is delivered from a higher layer of the first node to a PHY layer of the first node.

In one embodiment, the first priority is a ProSe Per-Packet Priority (i.e., Proximity Services Per-Packet Priority, or PPPP).

In one embodiment, for the definition of the first priority, refer to 3GPP TS23.285, section 4.4.5.1.

In one embodiment, the first signaling comprises a first parameter.

In one embodiment, the first signaling explicitly indicates the first parameter.

In one embodiment, the first signaling comprises a positive integer number of first-type field(s), and a second field is one of the positive integer number of first-type field(s) comprised in the first signaling, the second field being used to indicate the first parameter.

In one embodiment, the second field comprises a positive integer number of bit(s).

In one embodiment, the second field comprises 1 bit.

In one embodiment, the first parameter is a non-negative integer.

In one embodiment, the first parameter is an integer from 0 through N, N being a maximum number of retransmissions.

In one embodiment, when the first parameter is a first given value, it is indicated that the first radio resource block is reserved for an initial transmission.

In one embodiment, the first given value is a Boolean Value of "TRUE".

In one embodiment, the first given value is an integer.

In one embodiment, the first given value is an integer from 0 through N.

In one embodiment, the first given value is 0.

In one embodiment, when the first parameter is a second given value, it is indicated that the first radio resource block is not reserved for an initial transmission, the second given value being an integer.

In one embodiment, when the first parameter is a second given value, it is indicated that the first radio resource block is reserved for a retransmission.

In one embodiment, the second given value is a Boolean Value of "FALSE".

In one embodiment, the second given value is an integer.

In one embodiment, the second given value is an integer from 1 through N.

In one embodiment, the second given value is 1.

In one embodiment, when the first parameter is a second given value, it is indicated that the first radio resource block is reserved for a Ni-th retransmission, the second given value being an integer and Ni being a positive integer from 1 through N.

In one embodiment, the second given value is equal to Ni.

In one embodiment, the first signaling implicitly indicates the first parameter.

In one embodiment, a scrambling sequence of the first signaling is used to indicate the first parameter.

In one embodiment, an initial value of a scrambling sequence of the first signaling is used to indicate the first parameter.

In one embodiment, the second field is an NDI.

In one embodiment, the second field is a Retransmission Index.

In one embodiment, the second field is a DMRS.

In one embodiment, the first signaling comprises a positive integer number of first-type fields, a third field and a fourth field are respectively first-type fields among the positive integer number of first-type fields comprised in the first signaling, and the third field and the fourth field are jointly used to indicate the first parameter.

In one embodiment, the third field is used to indicate an MCS, and the fourth field is used to indicate a DMRS.

In one embodiment, the third field is used to indicate an MCS, and the fourth field is used to indicate an AP.

In one embodiment, the third field is used to indicate an NDI, and the fourth field is used to indicate an RV.

In one embodiment, the third field is used to indicate an NDI, and the fourth field is used to indicate a Retransmission Index.

In one embodiment, the first radio resource block is comprised of a positive integer number of time-domain resource units in time domain.

In one embodiment, a positive integer number of time-domain resource units comprised by the first radio resource block are consecutive in time.

In one embodiment, at least two time-domain resource units among a positive integer number of time-domain resource units comprised by the first radio resource block are non-consecutive in time.

In one embodiment, the first radio resource block is comprised of a positive integer number of frequency-domain resource units in frequency domain.

In one embodiment, a positive integer number of frequency-domain resource units comprised by the first radio resource block are consecutive in frequency domain.

In one embodiment, at least two frequency-domain resource units among a positive integer number of frequency-domain resource units comprised by the first radio resource block are non-consecutive in frequency domain.

In one embodiment, the first radio resource block comprises a positive integer number of time-frequency resource units.

In one embodiment, the positive integer number of time-frequency resource units comprised by the first radio resource block are consecutive in time domain.

In one embodiment, the positive integer number of time-frequency resource units comprised by the first radio resource block are consecutive in frequency domain.

In one embodiment, at least two time-frequency resource units among the positive integer number of time-frequency resource units comprised by the first radio resource block are non-consecutive in time domain.

In one embodiment, at least two time-frequency resource units among the positive integer number of time-frequency resource units comprised by the first radio resource block are non-consecutive in frequency domain.

In one embodiment, the first radio resource block belongs to Sidelink (SL) Spectrum.

In one embodiment, the first radio resource block belongs to Uplink (UL) Spectrum.

In one embodiment, the first radio resource block belongs to Downlink (DL) Spectrum.

In one embodiment, the first radio resource block belongs to Unlicensed Spectrum.

In one embodiment, the first radio resource block belongs to Licensed Spectrum.

In one embodiment, the first radio resource block belongs to V2X-specific Spectrum.

In one embodiment, the first radio resource block belongs to a carrier.

In one embodiment, the first radio resource block belongs to a Bandwidth Part (BWP).

In one embodiment, the first radio resource block comprises a PSCCH.

In one embodiment, the first radio resource block comprises a PSSCH.

In one embodiment, the first radio resource block comprises a Physical Sidelink Feedback Channel (PSFCH).

In one embodiment, the first radio resource block comprises a PSCCH and a PSSCH.

In one embodiment, the first radio resource block comprises a PSCCH and a PSFCH.

In one embodiment, the first radio resource block comprises a PSCCH, a PSSCH and a PSFCH.

In one embodiment, the first radio resource block comprises a Physical Uplink Control Channel (PUCCH).

In one embodiment, the first radio resource block comprises a Physical Uplink Shared Channel (PUSCH).

In one embodiment, the first radio resource block comprises a PUCCH and a PUSCH.

In one embodiment, the first radio resource block comprises a Physical Random Access Channel (PRACH).

In one embodiment, the first radio resource block comprises a Narrowband Physical Uplink Control Channel (NPUCCH).

In one embodiment, the first radio resource block comprises a Narrowband Physical Uplink Shared Channel (NPUSCH).

In one embodiment, the first radio resource block comprises a NPUCCH and a NPUSCH.

In one embodiment, the phrase that "the first priority and the first parameter are jointly used to determine whether the first radio resource block can be occupied" includes: a communication node other than the second node of the present disclosure determines whether to occupy the first radio resource block according to the first priority and the first parameter.

In one embodiment, the phrase that "the first priority and the first parameter are jointly used to determine whether the first radio resource block can be occupied" includes: the first node determines whether to occupy the first radio resource block according to the first priority and the first parameter.

Embodiment 2

Figure 2:
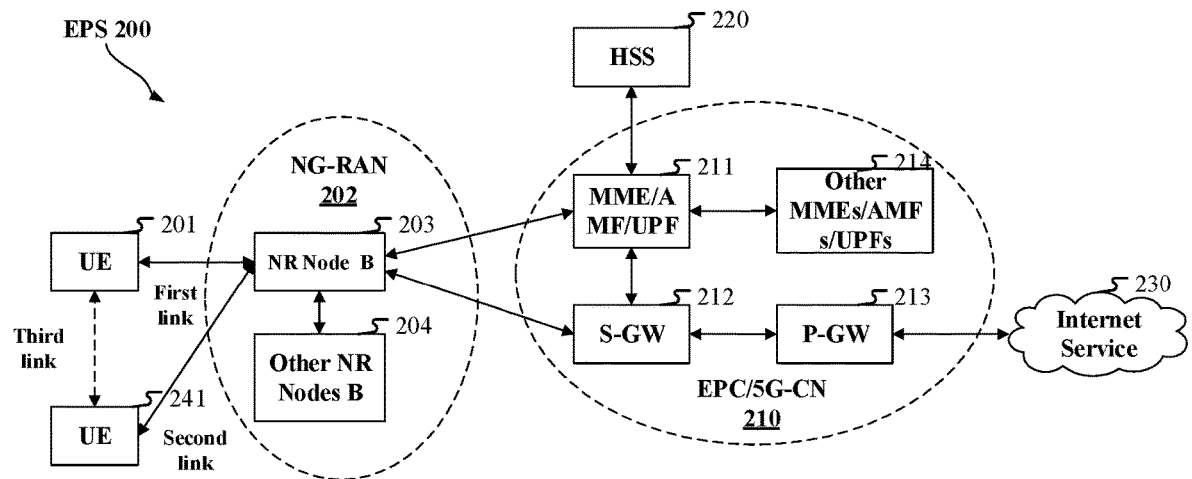
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, and a UE241 in sidelink communication with the UE(s) 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an SING interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present disclosure comprises the UE 201.

In one embodiment, the second node in the present disclosure comprises the UE 241.

In one embodiment, the UE in the present disclosure comprises the UE 201.

In one embodiment, the UE in the present disclosure comprises the UE 241.

In one embodiment, the UE 201 supports sidelink transmission.

In one embodiment, the UE 201 supports a PC5 interface.

In one embodiment, the UE 241 supports sidelink transmission.

In one embodiment, the UE 241 supports a PC5 interface.

In one embodiment, a transmitter for transmitting the first signaling in the present disclosure comprises the UE 241.

In one embodiment, a receiver for receiving the first signaling in the present disclosure comprises the UE 201.

In one embodiment, a transmitter for transmitting a first radio signal in the present disclosure comprises the UE 241.

In one embodiment, a transmitter for transmitting the second radio signal in the present disclosure comprises the UE 201.

In one embodiment, a receiver for receiving the first configuration information in the present disclosure comprises the UE 201.

Embodiment 3

Figure 3:
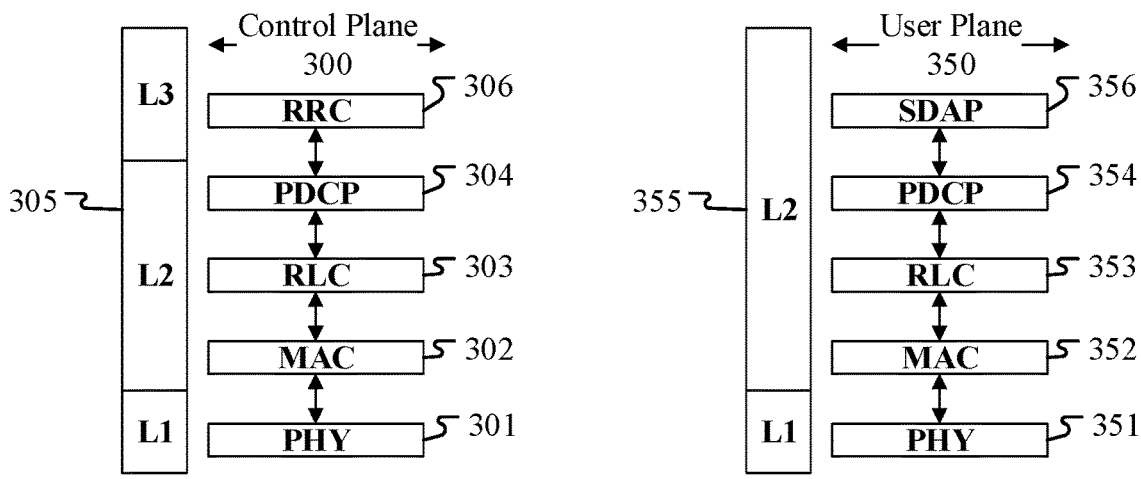
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the MAC 352.

In one embodiment, the first signaling in the present disclosure is generated by the PHY 351.

In one embodiment, the first radio signal in the present disclosure is generated by the SDAP sublayer 356.

In one embodiment, the first radio signal in the present disclosure is generated by the RRC sublayer 306.

In one embodiment, the second radio signal in the present disclosure is generated by the SDAP sublayer 356.

In one embodiment, the second radio signal in the present disclosure is generated by the RRC sublayer 306.

In one embodiment, the first configuration information in the present disclosure is generated by the SDAP sublayer 356.

In one embodiment, the first configuration information in the present disclosure is transmitted to the PHY 351 via the MAC sublayer 352.

In one embodiment, the first configuration information in the present disclosure is generated by the RRC sublayer 306.

In one embodiment, the first configuration information in the present disclosure is transmitted to the PHY 301 via the MAC sublayer 302.

Embodiment 4

Figure 4:
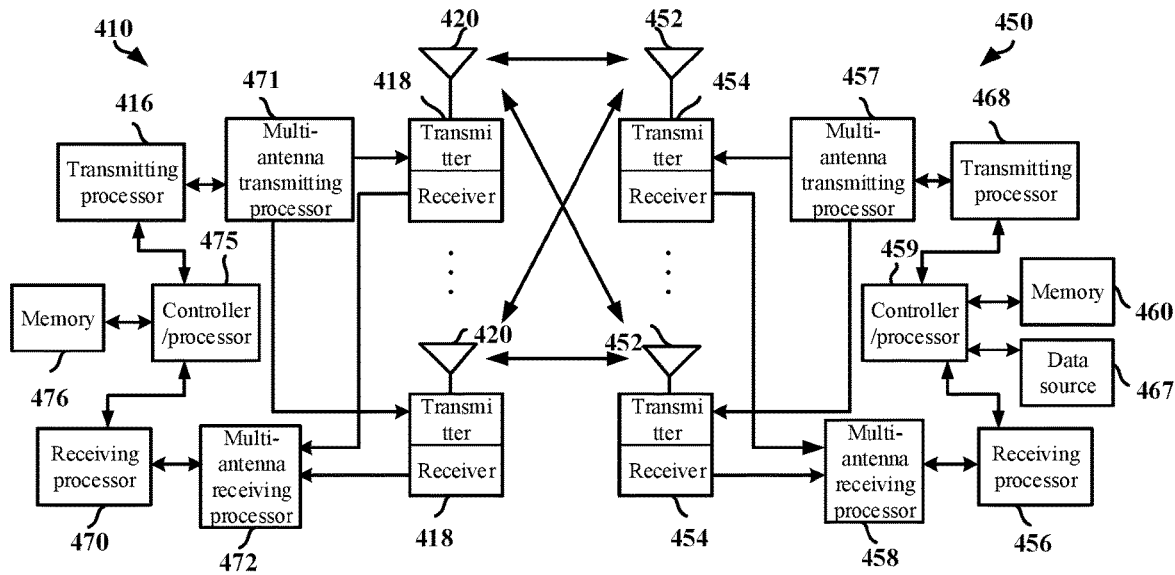
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In the transmission from the first communication device 410 to the second communication device 450, the controller/processor 475 provides header compression, encryption, packet segmentation and reordering, multiplexing between a logical channel and a transport channel and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the first communication device 410 to the second communication device 450, at the second communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor is responsible for using ACK and/or NACK protocols for error detection as a way of supporting HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the second communication device 450 comprises a memory that stores a computer readable instruction program. The computer readable instruction program generates an action when executed by at least one processor. The action includes: receiving a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the first communication device 410 comprises at least one processor and at least one memory. The at least one memory comprises computer program codes. The at least one memory and the computer program codes are configured to be used in collaboration with the at least one processor. The first communication device 410 at least transmits a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the first communication device 410 comprises a memory that stores a computer readable instruction program. The computer readable instruction program generates an action when executed by at least one processor. The action includes: transmitting a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, at least one of the antenna 452, the receiver 454, the multi-antenna receiving processor 458, the receiving processor 456, the controller/processor 459, the memory 460 or the data source 467 is used for receiving a first signaling in the present disclosure.

In one embodiment, at least one of the antenna 452, the receiver 454, the multi-antenna receiving processor 458, the receiving processor 456, the controller/processor 459, the memory 460 or the data source 467 is used for determining a first advancement priority in the present disclosure.

In one embodiment, at least one of the antenna 452, the receiver 454, the multi-antenna receiving processor 458, the receiving processor 456, the controller/processor 459, the memory 460 or the data source 467 is used for determining a first threshold offset in the present disclosure.

In one embodiment, at least one of the antenna 452, the receiver 454, the multi-antenna receiving processor 458, the receiving processor 456, the controller/processor 459, the memory 460 or the data source 467 is used for receiving first configuration information in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting a second radio signal on the first radio resource block in the present disclosure.

In one embodiment, at least one of the antenna 420, the transmitter 418, the multi-antenna transmitting processor 471, the transmitting processor 416, the controller/processor 475 or the memory 476 is used for transmitting a first signaling in the present disclosure.

In one embodiment, at least one of the antenna 420, the transmitter 418, the multi-antenna transmitting processor 471, the transmitting processor 416, the controller/processor 475 or the memory 476 is used for transmitting a first radio signal on the first radio resource block in the present disclosure.

Embodiment 5

Figure 5:
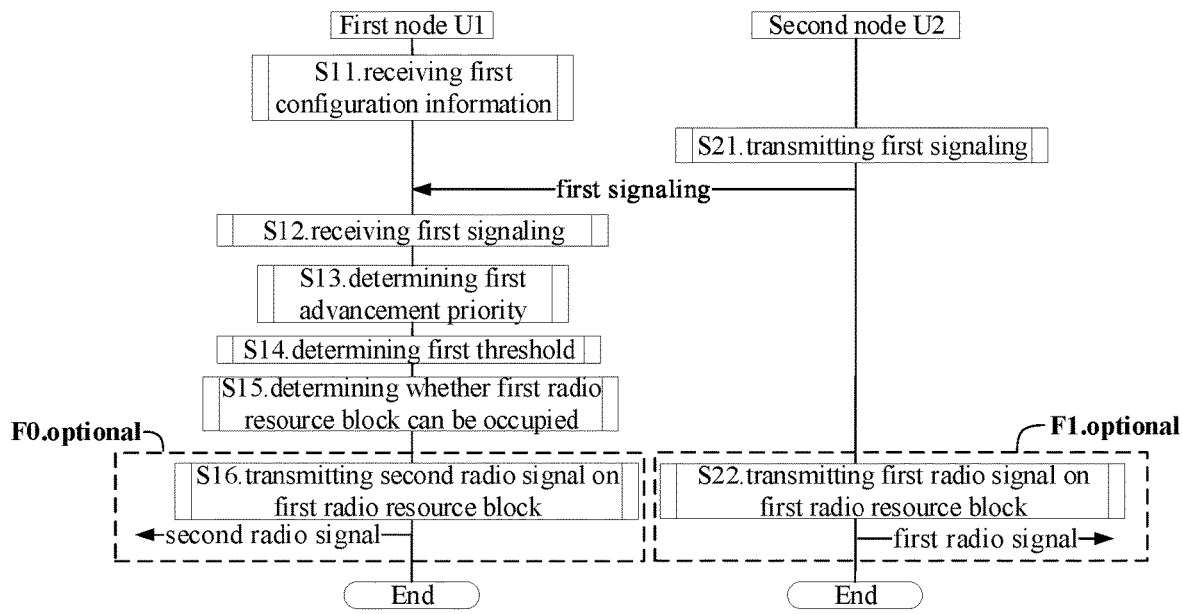
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communications via an air interface. Steps marked by the broken-line framed boxes F0 and F1 are optional, respectively.

The first node U1 receives first configuration information in step S11; receives a first signaling in step S12; and determines a first advancement priority in step S13; determines a first threshold in step S14; determines whether a first radio resource block can be occupied in step S15; and transmits a second radio signal on the first radio resource block in step S16.

The second node U2 transmits a first signaling in step S21; and transmits a first radio signal on a first radio resource block in step S22.

In Embodiment 5, the first signaling is used to indicate a first priority, a first parameter and a first radio resource block; the first parameter is used to indicate whether the first radio resource block is to be reserved for an initial transmission; and the first priority and the first parameter are jointly used by the first node U1 to determine the first advancement priority; the first advancement priority is linear with the first priority and a first priority offset; the first parameter is used by the first node U1 to determine the first priority offset; the first configuration information is used to indicate a second advancement priority; the first advancement priority and the second advancement priority are jointly used by the first node U1 to determine a first threshold; the first threshold is used by the first node U1 to determine whether the first radio resource block can be occupied.

In one embodiment, the first node U1 and the second node U2 are in communication through SL.

In one embodiment, when determining that the first radio resource block can be occupied, the first node U1 transmits the second radio signal on the first radio resource block.

In one embodiment, when determining that the first radio resource block can be occupied, the first node U1 drops transmitting the second radio signal on the first radio resource block.

In one embodiment, when determining that the first radio resource block can be occupied, the first node U1 autonomously decides whether to transmit the second radio signal on the first radio resource block.

In one embodiment, when the first node U1 determines that the first radio resource block can be occupied, the first radio resource block belongs to a first resource pool.

In one embodiment, when determining that the first radio resource block cannot be occupied, the first node U1 drops transmitting the second radio signal on the first radio resource block.

In one embodiment, when the first node U1 determines that the first radio resource block cannot be occupied, the first radio resource block does not belong to a first resource pool.

In one embodiment, the step marked by the box F0 in FIG. 5 exists.

In one embodiment, the step marked by the box F0 in FIG. 5 does not exist.

In one embodiment, when the first node U1 determines that the first radio resource block can be occupied, the step marked by the box F0 in FIG. 5 exists.

In one embodiment, when the first node U1 determines that the first radio resource block can be occupied, the step marked by the box F0 in FIG. 5 does not exist.

In one embodiment, when determining that the first radio resource block can be occupied, the first node U1 autonomously decides whether the step marked by the box F0 in FIG. 5 exists.

In one embodiment, the step marked by the box F1 in FIG. 5 exists.

In one embodiment, the step marked by the box F1 in FIG. 5 does not exist.

In one embodiment, the step marked by the box F1 in FIG. 5 always exists.

In one embodiment, in cases when a first bit block is not correctly received, the step marked by the box F1 in FIG. 5 exists, the first bit block being used to generate the first radio signal.

In one embodiment, in cases when a first bit block is correctly received, the step marked by the box F1 in FIG. 5 does not exist, the first bit block being used to generate the first radio signal.

In one embodiment, in cases when a second bit block is not correctly received, the step marked by the box F1 in FIG. 5 does not exist, the first bit block is used to generate the first radio signal, and the first bit block is different from the second bit block.

In one embodiment, in cases when a second bit block is correctly received, the step marked by the box F1 in FIG. 5 does not exist, the first bit block is used to generate the first radio signal, and the first bit block is different from the second bit block.

In one embodiment, the step marked by the box F0 in FIG. 5 does not exist; while the step marked by the box F1 in FIG. 5 exists.

In one embodiment, the step marked by the box F0 in FIG. 5 does not exist; while the step marked by the box F1 in FIG. 5 does not exist.

In one embodiment, the step marked by the box F0 in FIG. 5 exists; while the step marked by the box F1 in FIG. 5 exists.

In one embodiment, the step marked by the box F0 in FIG. 5 exists; while the step marked by the box F1 in FIG. 5 does not exist.

In one embodiment, the action of being correctly received comprises: performing channel decoding on a radio signal, by which a result yielded will pass CRC check.

In one embodiment, the action of being correctly received comprises: performing energy detection on the radio signal in a period, yielding a result of which an average value in the period will exceed a first given threshold.

In one embodiment, the action of being correctly received comprises: performing coherent detection on the radio signal, through which a signal energy obtained will exceed a second given threshold.

In one embodiment, the first bit block being correctly received comprises: a result of performing channel decoding on a third radio signal passes CRC check, and the first bit block is used respectively for generating the first radio signal and the third radio signal.

In one embodiment, the first bit block being correctly received comprises: a result of performing receive (Rx) power detection on a third radio signal is higher than a given Rx power threshold, and the first bit block is used respectively for generating the first radio signal and the third radio signal.

In one embodiment, the first bit block being correctly received comprises: an average value of performing multiple Rx power detections on a third radio signal is higher than a given Rx power threshold, and the first bit block is used respectively for generating the first radio signal and the third radio signal.

In one embodiment, the first bit block being not correctly received comprises: a result of performing channel decoding on a third radio signal does not pass CRC check, and the first bit block is used respectively for generating the first radio signal and the third radio signal.

In one embodiment, the first bit block being not correctly received comprises: a result of performing receive (Rx) power detection on a third radio signal is no higher than a given Rx power threshold, and the first bit block is used respectively for generating the first radio signal and the third radio signal.

In one embodiment, the first bit block being not correctly received comprises: an average value of performing multiple Rx power detections on a third radio signal is no higher than a given Rx power threshold, and the first bit block is used respectively for generating the first radio signal and the third radio signal.

In one embodiment, the second bit block being correctly received comprises: a result of performing channel decoding on a fourth radio signal passes CRC check, the second bit block is used for generating the fourth radio signal, and the first bit block is used for generating the first radio signal.

In one embodiment, the second bit block being correctly received comprises: a result of performing Rx power detection on a fourth radio signal is higher than a given Rx power threshold, the second bit block is used for generating the fourth radio signal, and the first bit block is used for generating the first radio signal.

In one embodiment, the second bit block being correctly received comprises: an average value of performing multiple Rx power detections on a fourth radio signal is higher than a given Rx power threshold, the second bit block is used for generating the fourth radio signal, and the first bit block is used for generating the first radio signal.

In one embodiment, the second bit block being not correctly received comprises: a result of performing channel decoding on a fourth radio signal does not pass CRC check, the second bit block is used for generating the fourth radio signal, and the first bit block is used for generating the first radio signal.

In one embodiment, the second bit block being not correctly received comprises: a result of performing Rx power detection on a fourth radio signal is no higher than a given Rx power threshold, the second bit block is used for generating the fourth radio signal, and the first bit block is used for generating the first radio signal.

In one embodiment, the second bit block being not correctly received comprises: an average value of performing multiple Rx power detections on a fourth radio signal is no higher than a given Rx power threshold, the second bit block is used for generating the fourth radio signal, and the first bit block is used for generating the first radio signal.

In one embodiment, the channel decoding is based on Viterbi Algorithm.

In one embodiment, the channel decoding is based on iteration.

In one embodiment, the channel decoding is based on Belief Propagation (BP) Algorithm.

In one embodiment, the channel decoding is based on Log Likelihood Ratio (LLR)-BP Algorithm.

In one embodiment, the first bit block comprises a positive integer number of sequentially arranged bits.

In one embodiment, the first bit block comprises a positive integer number of Code Block(s) (CB(s)).

In one embodiment, the first bit block comprises a positive integer number of Code Block Group(s) (CBG(s)).

In one embodiment, the first bit block comprises one Transport Block (TB).

In one embodiment, the first bit block comprises all bits in a TB.

In one embodiment, the first bit block comprises part of bits in a TB.

In one embodiment, the first bit block is obtained by a TB through TB-level Cyclic Redundancy Check (CRC) Attachment.

In one embodiment, the first bit block is a CB among CBs obtained by a TB sequentially through TB-level CRC Attachment, Code Block Segmentation, and CB-level CRC Attachment.

In one embodiment, the first bit block comprises a Channel State Information (CSI) report.

In one embodiment, the first bit block comprises a Channel Quality Indicator (CQI) report.

In one embodiment, the first bit block comprises a Rank Indicator (RI) report.

In one embodiment, the first bit block comprises a Reference Signal Received Power (RSRP) report.

In one embodiment, the first bit block comprises a Reference Signal Received Quality (RSRQ) report.

In one embodiment, the first bit block comprises a Signal-to-Noise and Interference Ratio (SINR) report.

In one embodiment, the first bit block comprises data transmitted on a Sidelink Shared Channel (SL-SCH).

In one embodiment, the first bit block comprises data transmitted on a Sidelink Broadcast Channel (SL-BCH).

In one embodiment, the first bit block comprises data transmitted on a Downlink Shared Channel (DL-SCH).

In one embodiment, the first bit block comprises data transmitted on a Uplink Shared Channel (UL-SCH).

In one embodiment, the second bit block comprises a positive integer number of sequentially arranged bits, the second bit block being different from the first bit block.

In one embodiment, the second bit block comprises a positive integer number of CB(s).

In one embodiment, the second bit block comprises a positive integer number of CBG(s).

In one embodiment, the second bit block comprises one TB.

In one embodiment, the second bit block comprises all bits in a TB.

In one embodiment, the second bit block comprises part of bits in a TB.

In one embodiment, the second bit block is obtained by a TB through TB-level CRC Attachment.

In one embodiment, the second bit block is a CB among CBs obtained by a TB sequentially through TB-level CRC Attachment, CB Segmentation, and CB-level CRC Attachment.

In one embodiment, the second bit block comprises a CSI report.

In one embodiment, the second bit block comprises a CQI report.

In one embodiment, the second bit block comprises an RI report.

In one embodiment, the second bit block comprises an RSRP report.

In one embodiment, the second bit block comprises an RSRQ report.

In one embodiment, the second bit block comprises an SINR report.

In one embodiment, the second bit block comprises data transmitted on a SL-SCH.

In one embodiment, the second bit block comprises data transmitted on a SL-BCH.

In one embodiment, the second bit block comprises data transmitted on a DL-SCH.

In one embodiment, the second bit block comprises data transmitted on a UL-SCH.

In one embodiment, a target receiver for receiving the first radio signal does not comprise the first node U1.

In one embodiment, a target receiver for receiving the first radio signal comprises the first node U1.

In one embodiment, the first radio signal is cell-specific.

In one embodiment, the first radio signal is UE-specific.

In one embodiment, the first radio signal is broadcast.

In one embodiment, the first radio signal is groupcast.

In one embodiment, the first radio signal is unicast.

In one embodiment, the first radio signal occupies all time-domain resource units in the first radio resource block.

In one embodiment, the first radio signal occupies all frequency-domain resource units in the first radio resource block.

In one embodiment, the first radio signal occupies all time-frequency resource units in the first radio resource block.

In one embodiment, the first radio signal occupies partial time-domain resource units in the first radio resource block.

In one embodiment, the first radio signal occupies partial frequency-domain resource units in the first radio resource block.

In one embodiment, the first radio signal occupies partial time-frequency resource units in the first radio resource block.

In one embodiment, the first radio signal occupies a PSSCH in the first radio resource block.

In one embodiment, the first radio signal occupies a PSCCH and a PSSCH in the first radio resource block.

In one embodiment, the first radio signal occupies a NPUCCH and a NPUSCH in the first radio resource block.

In one embodiment, the first radio signal occupies a NPUSCH in the first radio resource block.

In one embodiment, a first bit block is used for generating the first radio signal, the first bit block being comprised of a positive integer number of sequentially arranged bits.

In one embodiment, the first radio signal comprises a first bit block, the first bit block being comprised of sequentially arranged bits.

In one embodiment, the first radio signal is obtained by all or part of bits in the first bit block sequentially through TB-level CRC Attachment, Code Block Segment, and CB-level CRC Attachment, Channel Coding, Rate Matching, Code Block Concatenation, and Scrambling, Modulation, Layer Mapping, and Antenna Port Mapping, and Mapping to Physical Resource Blocks, as well as Baseband Signal Generation and Modulation and Upconversion.

In one embodiment, the first radio signal is an output by the first bit block sequentially through a Modulation Mapper, a Layer Mapper, Precoding, a Resource Element Mapper, and Multi-carrier Symbol Generation.

In one embodiment, the channel coding is based on a polar code.

In one embodiment, the channel coding is based on a Low-density Parity-Check (LDPC) code.

In one embodiment, only the first bit block is used for generating the first radio signal.

In one embodiment, there is also a bit block other than the first bit block that is used for generating the first radio signal.

In one embodiment, the first radio signal comprises Sidelink Feedback Information (SFI).

In one embodiment, the first radio signal comprises a Hybrid Automatic Repeat request-Acknowledge (HARQ-ACK).

In one embodiment, the first radio signal comprises a Hybrid Automatic Repeat request-Negative Acknowledge (HARQ-NACK).

In one embodiment, the first radio resource block is reserved for the first radio signal.

In one embodiment, the first radio resource block is reserved for the first bit block.

In one embodiment, the first radio resource block is reserved for the first radio signal, the first radio signal being an initial transmission of the first bit block.

In one embodiment, the first radio resource block is reserved for the first radio signal, the first radio signal being a retransmission of the first bit block.

In one embodiment, the first parameter indicates that the first radio resource block is reserved for the first radio signal, the first radio signal being an initial transmission of the first bit block.

In one embodiment, the first parameter indicates that the first radio resource block is reserved for the first radio signal, the first radio signal being a retransmission of the first bit block.

In one embodiment, the first bit block is used respectively for generating the first radio signal and the third radio signal.

In one embodiment, the first radio signal is a retransmission of the first bit block.

In one embodiment, the third radio signal is an initial transmission of the first bit block, and the first radio signal is a retransmission of the first bit block.

In one embodiment, the third radio signal comprises all or partial bits in the first bit block.

In one embodiment, the third radio signal is obtained by all or part of bits in the first bit block sequentially through TB-level CRC Attachment, Code Block Segment, and CB-level CRC Attachment, Channel Coding, Rate Matching, Code Block Concatenation, and Scrambling, Modulation, Layer Mapping, and Antenna Port Mapping, and Mapping to Physical Resource Blocks, as well as Baseband Signal Generation and Modulation and Upconversion.

In one embodiment, the third radio signal is an output by the first bit block sequentially through a Modulation Mapper, a Layer Mapper, Precoding, a Resource Element Mapper, and Multi-carrier Symbol Generation.

In one embodiment, only the first bit block is used for generating the third radio signal.

In one embodiment, there is also a bit block other than the first bit block that is used for generating the third radio signal.

In one embodiment, the third radio signal comprises a first signaling, the first signaling being used to indicate a transmission format of the third radio signal.

In one embodiment, the third radio signal comprises a first signaling, the first signaling being used to indicate configuration information of the third radio signal.

In one embodiment, the first signaling is used to indicate an MCS employed by the third radio signal.

In one embodiment, the first signaling is used to indicate a time-frequency resource unit occupied by the first radio resource block and an MCS employed by the third radio signal.

In one embodiment, the first signaling is used to indicate a DMRS employed by the third radio signal.

In one embodiment, the first signaling is used to indicate a Transmit (Tx) power adopted by the third radio signal.

In one embodiment, the first signaling is used to indicate an RV adopted by the third radio signal.

In one embodiment, the first signaling is used to indicate a total number of bits comprised in the first bit block.

In one embodiment, the third radio signal comprises the first signaling and the first bit block, the first signaling being associated with the first bit block.

In one embodiment, the third radio signal is transmitted on a PSSCH.

In one embodiment, the third radio signal is transmitted on a PSCCH and a PSSCH.

In one embodiment, the first bit block is used for generating the first radio signal, while the second bit block is used for generating the fourth radio signal.

In one embodiment, the first radio signal is an initial transmission of the first bit block.

In one embodiment, the fourth radio signal is an initial transmission of the second bit block, and the first radio signal is a retransmission of the first bit block.

In one embodiment, the fourth radio signal is an initial transmission of the second bit block, and the first radio signal is an initial transmission of the first bit block.

In one embodiment, the fourth radio signal comprises all or partial bits in the second bit block.

In one embodiment, the fourth radio signal is obtained by all or part of bits in the second bit block sequentially through TB-level CRC Attachment, Code Block Segment, and CB-level CRC Attachment, Channel Coding, Rate Matching, Code Block Concatenation, and Scrambling, Modulation, Layer Mapping, and Antenna Port Mapping, and Mapping to Physical Resource Blocks, as well as Baseband Signal Generation and Modulation and Upconversion.

In one embodiment, the fourth radio signal is an output by the second bit block sequentially through a Modulation Mapper, a Layer Mapper, Precoding, a Resource Element Mapper, and Multi-carrier Symbol Generation.

In one embodiment, only the second bit block is used for generating the fourth radio signal.

In one embodiment, there is also a bit block other than the second bit block that is used for generating the fourth radio signal.

In one embodiment, the fourth radio signal comprises a first signaling, the first signaling being used to indicate a transmission format of the fourth radio signal.

In one embodiment, the fourth radio signal comprises a first signaling, the first signaling being used to indicate configuration information of the fourth radio signal.

In one embodiment, the first signaling is used to indicate an MCS employed by the fourth radio signal.

In one embodiment, the first signaling is used to indicate a time-frequency resource unit occupied by the first radio resource block and an MCS employed by the fourth radio signal.

In one embodiment, the first signaling is used to indicate a time-frequency resource unit occupied by the first radio resource block and a time-frequency resource unit occupied by the fourth radio signal.

In one embodiment, the first signaling is used to indicate a DMRS employed by the fourth radio signal.

In one embodiment, the first signaling is used to indicate a Transmit (Tx) power adopted by the fourth radio signal.

In one embodiment, the first signaling is used to indicate an RV adopted by the fourth radio signal.

In one embodiment, the first signaling is used to indicate a total number of bits comprised in the second bit block.

In one embodiment, the fourth radio signal comprises the first signaling and the second bit block, the first signaling being associated with the second bit block.

In one embodiment, the fourth radio signal is transmitted on a PSSCH.

In one embodiment, the fourth radio signal is transmitted on a PSCCH and a PSSCH.

Embodiment 6

Figure 6:
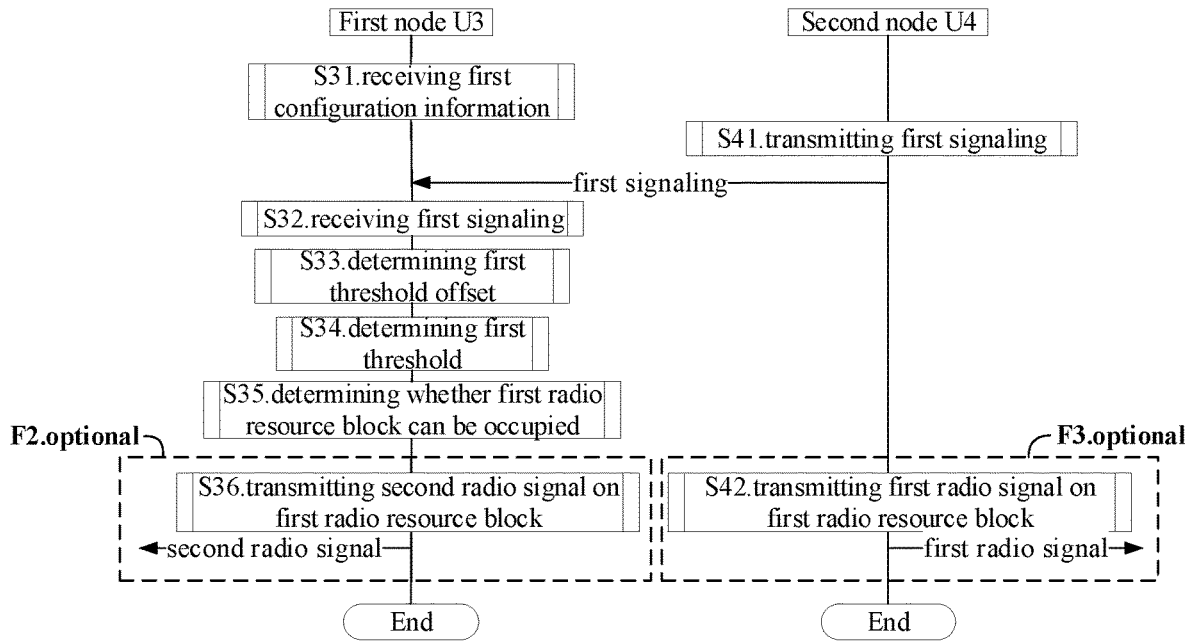
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a first node U3 and a second node U4 are in communication via an air interface. In FIG. 6, steps marked by the broken-line framed box F2 and box F3 are optional, respectively.

A first node U3 receives first configuration information in step S31; receives a first signaling in step S32; and determines a first threshold offset in step S33; determines a first threshold in step S34; determines in step S35 whether a first radio resource block can be occupied; and transmits a second radio signal on a first radio resource block in step S36.

A second node U4 transmits a first signaling in step S41; and transmits a first radio signal on a first radio resource block in step S42.

In Embodiment 6, the first signaling is used to indicate a first priority, a first parameter and a first radio resource block; the first parameter is used to indicate whether the first radio resource block is to be reserved for an initial transmission; the first configuration information is used to indicate a second priority; the first priority and the second priority are jointly used by the first node U3 to determine a first reference threshold; the first parameter is used by the first node U3 to determine the first threshold offset; the first threshold is linear with the first reference threshold and the first threshold offset; the first reference threshold and the first threshold offset are jointly used by the first node U3 to determine a first threshold; the first threshold is used by the first node U3 to determine whether the first radio resource block can be occupied.

In one embodiment, the first node U3 and the second node U4 are in communication through SL.

In one embodiment, the step marked by the box F2 in FIG. 6 exists.

In one embodiment, the step marked by the box F2 in FIG. 6 does not exist.

In one embodiment, when the first node U3 determines that the first radio resource block can be occupied, the step marked by the box F2 in FIG. 6 exists.

In one embodiment, when the first node U3 determines that the first radio resource block can be occupied, the step marked by the box F2 in FIG. 6 does not exist.

In one embodiment, when determining that the first radio resource block can be occupied, the first node U3 autonomously decides whether the step marked by the box F2 in FIG. 6 exists.

In one embodiment, the step marked by the box F3 in FIG. 6 exists.

In one embodiment, the step marked by the box F3 in FIG. 6 does not exist.

In one embodiment, the step marked by the box F3 in FIG. 6 always exists.

In one embodiment, in cases when a first bit block is not correctly received, the step marked by the box F3 in FIG. 6 exists, the first bit block being used to generate the first radio signal.

In one embodiment, in cases when a first bit block is correctly received, the step marked by the box F3 in FIG. 6 does not exist, the first bit block being used to generate the first radio signal.

In one embodiment, in cases when a second bit block is not correctly received, the step marked by the box F3 in FIG. 6 does not exist, the first bit block is used to generate the first radio signal, and the first bit block is different from the second bit block.

In one embodiment, in cases when a second bit block is correctly received, the step marked by the box F3 in FIG. 6 does not exist, the first bit block is used to generate the first radio signal, and the first bit block is different from the second bit block.

In one embodiment, the step marked by the box F2 in FIG. 6 does not exist; while the step marked by the box F3 in FIG. 6 exists.

In one embodiment, the step marked by the box F2 in FIG. 6 does not exist; while the step marked by the box F3 in FIG. 6 does not exist.

In one embodiment, the step marked by the box F2 in FIG. 6 exists; while the step marked by the box F3 in FIG. 6 exists.

In one embodiment, the step marked by the box F2 in FIG. 6 exists; while the step marked by the box F3 in FIG. 6 does not exist.

In one embodiment, a third bit block is used for generating the second radio signal, and the third bit block comprises a positive integer number of sequentially arranged bits.

In one embodiment, the third bit block comprises a positive integer number of CB(s).

In one embodiment, the third bit block comprises a positive integer number of CBG(s).

In one embodiment, the third bit block comprises one TB.

In one embodiment, the third bit block comprises all bits in a TB.

In one embodiment, the third bit block comprises part of bits in a TB.

In one embodiment, the third bit block is obtained by a TB through TB-level CRC Attachment.

In one embodiment, the third bit block is a CB among CBs obtained by a TB sequentially through TB-level CRC Attachment, CB Segmentation, and CB-level CRC Attachment.

In one embodiment, the third bit block comprises a CSI report.

In one embodiment, the third bit block comprises a CQI report.

In one embodiment, the third bit block comprises an RI report.

In one embodiment, the third bit block comprises an RSRP report.

In one embodiment, the third bit block comprises an RSRQ report.

In one embodiment, the third bit block comprises an SINR report.

In one embodiment, the third bit block comprises data transmitted on a SL-SCH.

In one embodiment, the third bit block comprises data transmitted on a SL-BCH.

In one embodiment, the third bit block comprises data transmitted on a DL-SCH.

In one embodiment, the third bit block comprises data transmitted on a UL-SCH.

In one embodiment, a target receiver for receiving the second radio signal does not comprise the second node U4.

In one embodiment, a target receiver for receiving the second radio signal comprises the second node U4.

In one embodiment, the second radio signal is cell-specific.

In one embodiment, the second radio signal is UE-specific.

In one embodiment, the second radio signal is broadcast.

In one embodiment, the second radio signal is groupcast.

In one embodiment, the second radio signal is unicast.

In one embodiment, the second radio signal occupies all time-domain resource units in the first radio resource block.

In one embodiment, the second radio signal occupies all frequency-domain resource units in the first radio resource block.

In one embodiment, the second radio signal occupies all time-frequency resource units in the first radio resource block.

In one embodiment, the second radio signal occupies partial time-domain resource units in the first radio resource block.

In one embodiment, the second radio signal occupies partial frequency-domain resource units in the first radio resource block.

In one embodiment, the second radio signal occupies partial time-frequency resource units in the first radio resource block.

In one embodiment, the second radio signal occupies a PSSCH in the first radio resource block.

In one embodiment, the second radio signal occupies a PSCCH and a PSSCH in the first radio resource block.

In one embodiment, the second radio signal occupies a NPUCCH and a NPUSCH in the first radio resource block.

In one embodiment, the second radio signal occupies a NPUSCH in the first radio resource block.

In one embodiment, the second radio signal comprises a third bit block, the third bit block being comprised of a positive integer number of sequentially arranged bits.

In one embodiment, the second radio signal is obtained by all or part of bits in the third bit block sequentially through TB-level CRC Attachment, Code Block Segment, and CB-level CRC Attachment, Channel Coding, Rate Matching, Code Block Concatenation, and Scrambling, Modulation, Layer Mapping, and Antenna Port Mapping, and Mapping to Physical Resource Blocks, as well as Baseband Signal Generation and Modulation and Upconversion.

In one embodiment, the second radio signal is an output by the third bit block sequentially through a Modulation Mapper, a Layer Mapper, Precoding, a Resource Element Mapper, and Multi-carrier Symbol Generation.

In one embodiment, only the third bit block is used for generating the second radio signal.

In one embodiment, there is also a bit block other than the third bit block that is used for generating the second radio signal.

In one embodiment, the second radio signal comprises SFI.

In one embodiment, the second radio signal comprises a HARQ-ACK.

In one embodiment, the second radio signal comprises a HARQ-NACK.

In one embodiment, the first configuration information is generated by a higher layer of the first node U3.

In one embodiment, the first configuration information is delivered from a higher layer of the first node U3 to a physical layer of the first node U3.

In one embodiment, the first configuration information is generated by an RRC sublayer 306 of the first node U3.

In one embodiment, the first configuration information is generated by a base station.

In one embodiment, the first configuration information is transmitted through a PDCCH.

In one embodiment, the first configuration information is transmitted through a NPDCCH.

In one embodiment, the first configuration information is UE-specific.

In one embodiment, the first configuration information is dynamically configured.

In one embodiment, the first configuration information is semi-statically configured.

In one embodiment, the first configuration information comprises one or more fields in a PHY layer signaling.

In one embodiment, the first configuration information comprises one or more fields in a piece of DCI.

In one embodiment, the first signaling comprises all or part of a higher-layer signaling.

In one embodiment, the first signaling comprises all or part of an RRC layer signaling.

In one embodiment, the first signaling comprises one or more fields in an RRC IE.

In one embodiment, the first signaling comprises one or more fields in a MAC layer signaling.

In one embodiment, the first signaling comprises one or more fields in a MAC CE.

In one embodiment, the first configuration information is used to indicate the second priority.

In one embodiment, the first configuration information comprises the second priority.

In one embodiment, the first configuration information comprises a positive integer number of second-type field(s), with the second priority being one of the positive integer number of second-type field(s).

Embodiment 7

Figure 7:
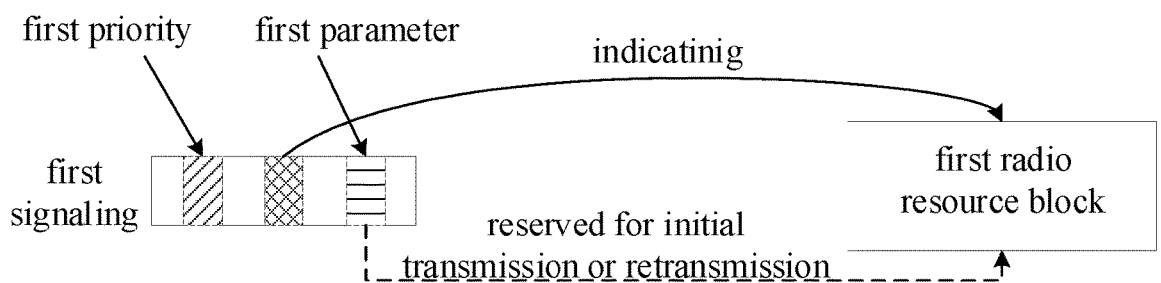
FIG. 7 illustrates a schematic diagram of relations between a first signaling, a first priority, a first parameter and a first radio resource block according to one embodiment of the present disclosure.

Embodiment 7 illustrates a schematic diagram of relations between a first signaling, a first priority, a first parameter and a first radio resource block according to one embodiment of the present disclosure, as shown in FIG. 7. In FIG. 7, the smaller rectangle framed with solid lines represents a first signaling, while the large one represents a first radio resource block, the slash-filled box framed with broken lines represents a first priority, and the stripe-filled one represents a first parameter.

In Embodiment 7, the first signaling in the present disclosure comprises a first priority and a first parameter, the first signaling indicates the first radio resource block, and the first parameter indicates whether the first radio resource block is to be reserved for an initial transmission.

In one embodiment, the first signaling is used for reserving the first radio resource block.

In one embodiment, the first signaling is used for indicating the first radio resource block.

In one embodiment, the first signaling explicitly indicates the first radio resource block.

In one embodiment, the first signaling implicitly indicates the first radio resource block.

In one embodiment, the first signaling is used for indicating a time-domain resource unit occupied by the first radio resource block.

In one embodiment, the first signaling is used for indicating a frequency-domain resource unit occupied by the first radio resource block.

In one embodiment, the first signaling is used for indicating a time-frequency resource unit occupied by the first radio resource block.

In one embodiment, the first signaling indicates a position of a frequency-domain resource unit occupied by the first radio resource block.

In one embodiment, the first signaling indicates a starting position of a frequency-domain resource unit occupied by the first radio resource block.

In one embodiment, the first signaling indicates a starting position of a time-domain resource unit occupied by the first radio resource block.

In one embodiment, the first signaling indicates a time-domain interval between at least two time-domain resource units comprised in the first radio resource block.

In one embodiment, the first signaling indicates a time-domain interval between at least two time-frequency resource units comprised in the first radio resource block.

In one embodiment, the time-domain interval is comprised of a positive integer number of time-domain resource unit(s).

In one embodiment, the first signaling indicates a frequency-domain interval between at least two frequency-domain resource units comprised in the first radio resource block.

In one embodiment, the first signaling indicates a frequency-domain interval between at least two time-frequency resource units comprised in the first radio resource block.

In one embodiment, the frequency-domain interval is comprised of a positive integer number of frequency-domain resource unit(s).

In one embodiment, a time-frequency resource unit occupied by the first signaling is used to determine the first radio resource block.

In one embodiment, a time-frequency resource unit occupied by the first signaling is used to determine a time-frequency resource unit occupied by the first radio resource block.

In one embodiment, a time-domain resource unit occupied by the first signaling is used to determine a starting position of the first radio resource block in time domain.

In one embodiment, a time-domain resource unit occupied by the first radio resource block and a time-domain resource unit occupied by the first signaling are spaced by a first time offset.

In one embodiment, the first time offset comprises a positive integer number of time-domain resource unit(s).

In one embodiment, the first time offset is pre-defined.

In one embodiment, the first time offset is configured by a higher-layer signaling.

In one embodiment, the first time offset is pre-configured.

In one embodiment, the first time offset is fixed.

In one embodiment, the third radio signal is transmitted on a second radio resource block.

In one embodiment, the second radio resource block comprises a time-frequency resource unit occupied by the third radio signal.

In one embodiment, the second radio resource block comprises a time-domain resource unit occupied by the third radio signal.

In one embodiment, the second radio resource block comprises a frequency-domain resource unit occupied by the third radio signal.

In one embodiment, the fourth radio signal is transmitted on a second radio resource block.

In one embodiment, the second radio resource block comprises a time-frequency resource unit occupied by the fourth radio signal.

In one embodiment, the second radio resource block comprises a time-domain resource unit occupied by the fourth radio signal.

In one embodiment, the second radio resource block comprises a frequency-domain resource unit occupied by the fourth radio signal.

In one embodiment, the first signaling indicates the second radio resource block.

In one embodiment, the first signaling indicates a frequency-domain resource unit occupied by the second radio resource block, and the first signaling indicates a time-domain resource unit occupied by the second radio resource block.

In one embodiment, the first signaling indicates a frequency-domain resource unit occupied by the second radio resource block, and a time-domain resource unit occupied by the first signaling is used to determine the time-domain resource unit occupied by the second radio resource block.

In one embodiment, a time-domain resource unit occupied by the first signaling is used to determine a time-domain resource unit occupied by the second radio resource block, and a frequency-domain resource unit occupied by the first signaling is used to determine a frequency-domain resource unit occupied by the second radio resource block.

In one embodiment, the first signaling indicates the second radio resource block, and the first signaling implicitly indicates the first radio resource block.

In one embodiment, the first signaling indicates the second radio resource block, and a frequency-domain resource unit occupied by the first radio resource block is related to a frequency-domain resource unit occupied by the second radio resource block.

In one embodiment, the first signaling indicates the second radio resource block, and a time-domain resource unit occupied by the first radio resource block is related to a time-domain resource unit occupied by the second radio resource block.

In one embodiment, a frequency-domain resource unit occupied by the first radio resource block is the same as a frequency-domain resource unit occupied by the second radio resource block.

In one embodiment, the first radio resource block and the second radio resource block are spaced by a second time offset in time domain.

In one embodiment, the second time offset comprises a positive integer number of time-domain resource unit(s).

In one embodiment, the first signaling indicates a frequency-domain resource unit occupied by the second radio resource block, and the first signaling indicates the second time offset.

In one embodiment, the first signaling indicates a frequency-domain resource unit occupied by the second radio resource block, and the second time offset is pre-defined.

In one embodiment, the first signaling indicates a frequency-domain resource unit occupied by the second radio resource block, and a time-domain resource unit occupied by the first signaling is used to determine a time-domain resource unit occupied by the second radio resource block, and the first signaling indicates the second time offset.

In one embodiment, a frequency-domain resource unit occupied by the first radio resource block and a frequency-domain resource unit occupied by the second radio resource block are spaced by a second frequency offset in frequency domain.

In one embodiment, the second frequency offset comprises a positive integer number of frequency-domain resource unit(s).

In one embodiment, the first signaling indicates the second radio resource block, and the first signaling indicates the second time offset and the second frequency-domain offset.

In one embodiment, the first signaling indicates a frequency-domain resource unit occupied by the second radio resource block, and the first signaling indicates the second time offset and the second frequency-domain offset.

In one embodiment, the first signaling indicates a time-domain resource unit occupied by the second radio resource block and a frequency-domain resource unit occupied by the second radio resource block respectively, and the first signaling indicates a time-domain interval between the second radio resource block and the first radio resource block.

In one embodiment, the first parameter being used to indicate that the first radio resource block is reserved for an initial transmission comprises: the first parameter is used to indicate that the first radio resource block is reserved for the former of an initial transmission and a retransmission.

In one embodiment, the first parameter being used to indicate that the first radio resource block is reserved for an initial transmission comprises: the first parameter is used to indicate that the first radio resource block is not reserved for a retransmission.

In one embodiment, the first parameter being used to indicate that the first radio resource block is reserved for an initial transmission comprises: the first parameter is used to indicate that the first radio resource block is not reserved for the latter of an initial transmission and a retransmission.

In one embodiment, the first parameter being used to indicate that the first radio resource block is reserved for an initial transmission comprises: the first parameter is used to indicate that the first radio resource block is not reserved for any one of N first-type retransmission(s), N being a positive integer.

In one embodiment, the first parameter being used to indicate that the first radio resource block is reserved for an initial transmission comprises: the first parameter is used to indicate that the first radio resource block is not reserved for an initial transmission or any one of N first-type retransmission(s), N being a positive integer.

In one embodiment, the first parameter is used to indicate whether the first radio resource block is reserved for a retransmission.

In one embodiment, the first parameter being used to indicate that the first radio resource block is not reserved for an initial transmission comprises: the first parameter is used to indicate that the first radio resource block is reserved for a retransmission.

In one embodiment, the first parameter being used to indicate that the first radio resource block is not reserved for an initial transmission comprises: the first parameter is used to indicate that the first radio resource block is reserved for the latter of an initial transmission and a retransmission.

In one embodiment, the first parameter being used to indicate that the first radio resource block is not reserved for an initial transmission comprises: the first parameter is used to indicate that the first radio resource block is reserved for an Ni-th retransmission, Ni being a positive integer.

In one embodiment, the first parameter being used to indicate that the first radio resource block is not reserved for an initial transmission comprises: the first parameter is used to indicate that the first radio resource block is reserved for a first target retransmission of N first-type retransmission(s), the first target retransmission being one of the N first-type retransmission(s), N being a positive integer.

In one embodiment, the first parameter being used to indicate that the first radio resource block is not reserved for an initial transmission comprises: the first parameter is used to indicate that the first radio resource block is reserved for an initial transmission and a first target retransmission of N first-type retransmission(s), the first target retransmission being one of the N first-type retransmission(s), N being a positive integer.

In one embodiment, when the first parameter indicates the former of an initial transmission and a retransmission, the first radio resource block is reserved for the initial transmission.

In one embodiment, when the first parameter indicates the latter of an initial transmission and a retransmission, the first radio resource block is not reserved for the initial retransmission.

In one embodiment, when the first parameter indicates the latter of an initial transmission and a retransmission, the first radio resource block is reserved for the retransmission.

In one embodiment, the first parameter indicates a first target retransmission, the first target retransmission being one of N first-type retransmission(s), and the first radio resource block is not reserved for an initial transmission.

In one embodiment, the first parameter indicates a first target retransmission, the first target retransmission being one of N first-type retransmission(s), and the first radio resource block is reserved for the first target retransmission.

In one embodiment, the first parameter indicates an initial transmission and a first-type retransmission of N first-type retransmission(s), and the first radio resource block is not reserved for the initial transmission.

Embodiment 8

Figure 8:
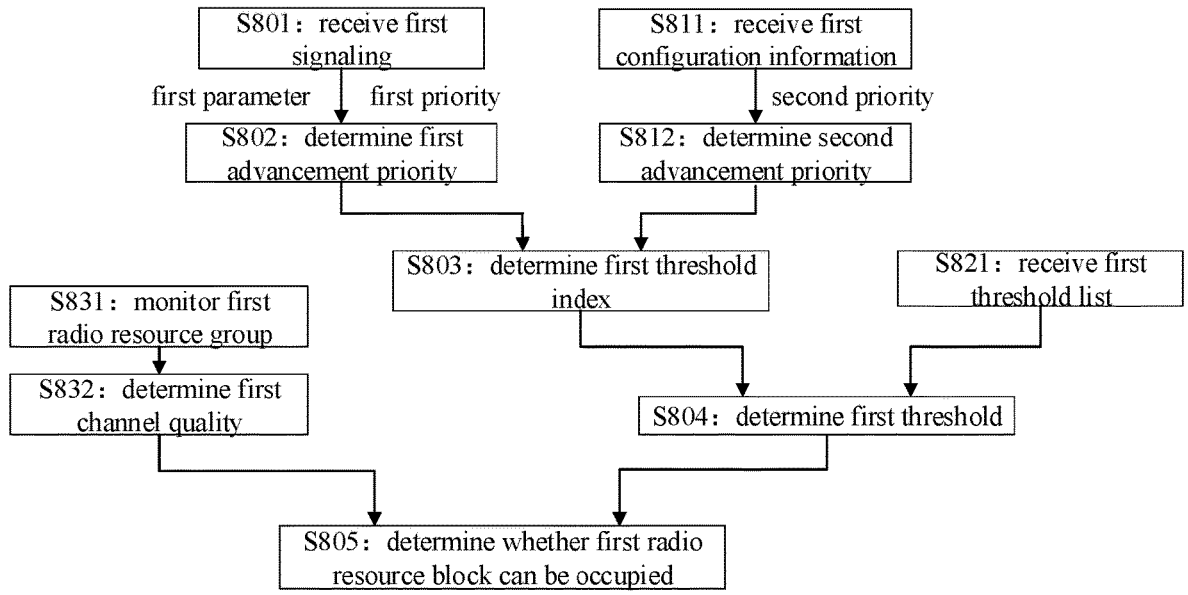
FIG. 8 illustrates a flowchart of determining whether a first radio resource block can be occupied according to one embodiment of the present disclosure.

Embodiment 8 illustrates a flowchart of determining whether a first radio resource block can be occupied according to one embodiment of the present disclosure, as shown in FIG. 8.

In Embodiment 8, receive a first signaling in step S801; determine a first advancement priority in step S802; receive first configuration information in step S811; and determine a second advancement priority in step S812; determine a first threshold index in step S803; receives a first threshold list in step S821; and determine a first threshold in step S804; monitor a first radio resource group in step S831; determine a first channel quality in step S832; and determine whether a first radio resource block can be occupied in step S805; the first signaling comprises the first priority and the first parameter in the present disclosure; the first priority and the first parameter are jointly used to determine the first advancement priority; the first configuration information comprises the second priority in the present disclosure; the second priority is used to determine the second advancement priority; the first advancement priority and the second advancement priority are jointly used to determine the first threshold index; the first threshold index and the first threshold list are jointly used to determine the first threshold; monitoring of the first radio resource group is used to determine the first channel quality; the first channel quality and the first threshold are jointly used to determine whether the first radio resource block can be occupied.

In one embodiment, the first priority is a first-type priority of Py first-type priorities, Py being a positive integer.

In one embodiment, any of the Py first-type priorities is a non-negative integer.

In one embodiment, any of the Py first-type priorities is a positive integer.

In one embodiment, Py is equal to 8.

In one embodiment, the first priority is a positive integer among Py positive integers.

In one embodiment, the first priority is a positive integer of 1 through Py.

In one embodiment, a message on a PC5 interface is assigned with one of the Py first-type priorities.

In one embodiment, a message on a PC5 interface corresponds to one of the Py first-type priorities.

In one embodiment, a V2X message is assigned with one of the Py first-type priorities.

In one embodiment, a V2X message corresponds to one of the Py first-type priorities.

In one embodiment, a UE serves all packets according to first-type priorities respectively corresponding to the packets, of which each is comprised of a positive integer number of sequentially arranged bits.

In one embodiment, the Py first-type priorities respectively correspond to Py positive integers.

In one embodiment, a first packet corresponds to a first target priority, and a second packet corresponds to a second target priority, the first target priority being one of the Py first-type priorities and the second target priority being one of the Py first-type priorities.

In one embodiment, the first target priority is smaller than the second target priority, and the first packet is preferentially served.

In one embodiment, the first target priority is smaller than the second target priority, and the first packet is preferentially scheduled.

In one embodiment, the first target priority is smaller than the second target priority, and a time-frequency resource unit is preferentially selected for the first packet.

In one embodiment, the first target priority is smaller than the second target priority, firstly a time-frequency resource unit is selected for the first packet, and then a time-frequency resource unit is selected for the second packet.

In one embodiment, the first target priority is smaller than the second target priority, and selecting a time-frequency resource unit for the first packet is earlier than selecting a time-frequency resource unit for the second packet.

In one embodiment, the first target priority is equal to the second target priority, and the first packet is served at a same level as the second packet.

In one embodiment, the first target priority is equal to the second target priority, and the first packet is served at a same time as the second packet.

In one embodiment, the first target priority is equal to the second target priority, time-frequency resource units are simultaneously selected for the first packet and the second packet.

In one embodiment, the first packet comprises a positive integer number of sequentially arranged bits.

In one embodiment, the second packet comprises a positive integer number of sequentially arranged bits.

In one embodiment, a first candidate bit block corresponds to a first target priority, while a second candidate bit block corresponds to a second target priority, the first target priority is one of the Py first-type priorities, and the second target priority is one of the Py first-type priorities.

In one embodiment, the first target priority is smaller than the second target priority, and the first candidate bit block is preferentially served.

In one embodiment, the first target priority is smaller than the second target priority, and the first candidate bit block is preferentially scheduled.

In one embodiment, the first target priority is smaller than the second target priority, and a time-frequency resource unit is preferentially selected for the first candidate bit block.

In one embodiment, the first target priority is smaller than the second target priority, firstly a time-frequency resource unit is selected for the first candidate bit block, and then a time-frequency resource unit is selected for the second candidate bit block.

In one embodiment, the first target priority is smaller than the second target priority, and selecting a time-frequency resource unit for the first candidate bit block is earlier than selecting a time-frequency resource unit for the second candidate bit block.

In one embodiment, the first target priority is equal to the second target priority, and the first candidate bit block is served at a same level as the second candidate bit block.

In one embodiment, the first target priority is equal to the second target priority, and the first candidate bit block is served at a same time as the second candidate bit block.

In one embodiment, the first target priority is equal to the second target priority, time-frequency resource units are simultaneously selected for the first candidate bit block and the second candidate bit block.

In one embodiment, the first candidate bit block is comprised of a positive integer number of sequentially arranged bits.

In one embodiment, the second candidate bit block is comprised of a positive integer number of sequentially arranged bits.

In one embodiment, the first radio resource block is reserved for the second packet, when the first target priority is smaller than the second target priority, the first radio resource block can be occupied by the first packet.

In one embodiment, the first radio resource block is reserved for the second candidate bit block, when the first target priority is smaller than the second target priority, the first radio resource block can be occupied by the first candidate bit block.

In one embodiment, the first radio resource block is reserved for the second packet, when the first target priority is equal to the second target priority, the first radio resource block cannot be occupied by the first packet.

In one embodiment, the first radio resource block is reserved for the second packet, when the first target priority is equal to the second target priority, the first radio resource block can be occupied by the first packet.

In one embodiment, the first radio resource block is reserved for the second candidate bit block, when the first target priority is equal to the second target priority, the first radio resource block can be occupied by the first candidate bit block.

In one embodiment, the first radio resource block is reserved for the second candidate bit block, when the first target priority is equal to the second target priority, the first radio resource block cannot be occupied by the first candidate bit block.

In one embodiment, the first radio resource block is reserved for the second candidate bit block, when the first target priority is greater than the second target priority, the first radio resource block cannot be occupied by the first candidate bit block.

In one embodiment, the first priority is assigned to the first bit block.

In one embodiment, the first parameter is used to determine a first priority offset.

In one embodiment, the first priority offset comprises a positive decimal.

In one embodiment, the first priority offset comprises a positive integer.

In one embodiment, the first priority offset comprises a negative decimal.

In one embodiment, the first priority offset comprises a negative integer.

In one embodiment, the first parameter indicates that the first radio resource block is reserved for an initial transmission, with the first priority offset being 0.

In one embodiment, the first parameter indicates that the first radio resource block is reserved for a retransmission, with the first priority offset being a positive number.

In one embodiment, the first parameter indicates that the first radio resource block is reserved for a retransmission, with the first priority offset being a negative number.

In one embodiment, the first radio signal is an initial transmission of the first bit block, with the first priority offset being 0.

In one embodiment, the first radio signal is a retransmission of the first bit block, with the first priority offset being a positive number.

In one embodiment, the first radio signal is a retransmission of the first bit block, with the first priority offset being a negative number.

In one embodiment, N retransmissions respectively correspond to N first-type priority offsets, and the first priority offset is one of the N first-type priority offsets.

In one embodiment, any first-type priority offset of the N first-type priority offsets is a positive decimal.

In one embodiment, any first-type priority offset of the N first-type priority offsets is a negative decimal.

In one embodiment, any first-type priority offset of the N first-type priority offsets is a positive integer.

In one embodiment, any first-type priority offset of the N first-type priority offsets is a negative integer.

In one embodiment, an Ni-th retransmission is one of N retransmissions, and an Ni-th first-type priority offset is one of the N first-type priority offset that corresponds to the Ni-th retransmission, Ni being a positive integer less than N.

In one embodiment, a (Ni+1)-th first-type priority offset is one of the N first-type priority offsets that corresponds to the (Ni+1)-th retransmission, and the (Ni+1)-th first-type priority offset is larger than the Ni-th first-type priority offset.

In one embodiment, a (Ni+1)-th first-type priority offset is one of the N first-type priority offsets that corresponds to the (Ni+1)-th retransmission, and the (Ni+1)-th first-type priority offset is smaller than the Ni-th first-type priority offset.

In one embodiment, the first parameter indicates that the first radio resource block is reserved for the Ni-th retransmission, and the first priority offset is an Ni-th first-type priority offset of the N first-type priority offsets.

In one embodiment, the first parameter indicates that the first radio resource block is reserved for the (Ni+1)-th retransmission, and the first priority offset is an (Ni+1)-th first-type priority offset of the N first-type priority offsets.

In one embodiment, the first radio signal is an Ni-th retransmission of the first bit block, and the first priority offset is an Ni-th first-type priority offset of the N first-type priority offsets.

In one embodiment, the first radio signal is a (Ni+1)-th retransmission of the first bit block, and the first priority offset is an (Ni+1)-th first-type priority offset of the N first-type priority offsets.

In one embodiment, the first parameter indicates that the first radio resource block is reserved for an initial transmission, and the first advancement priority is equal to the first priority.

In one embodiment, the first parameter indicates that the first radio resource block is reserved for a retransmission, and the first advancement priority is greater than the first priority.

In one embodiment, the first parameter indicates that the first radio resource block is reserved for a retransmission, and the first advancement priority is smaller than the first priority.

In one embodiment, the first radio signal is an initial transmission of the first bit block, and the first advancement priority is equal to the first priority.

In one embodiment, the first radio signal is a retransmission of the first bit block, and the first advancement priority is greater than the first priority.

In one embodiment, the first radio signal is a retransmission of the first bit block, and the first advancement priority is smaller than the first priority.

In one embodiment, the first advancement priority comprises a non-negative integer.

In one embodiment, the first advancement priority comprises a decimal.

In one embodiment, the first advancement priority comprises a non-negative decimal.

In one embodiment, the first advancement priority is linear with the first priority.

In one embodiment, the first advancement priority is linear with the first priority and the first priority offset.

In one embodiment, the first advancement priority is equal to a sum of the first priority and the first priority offset.

In one embodiment, the first advancement priority is equal to a difference between the first priority and the first priority offset.

In one embodiment, the first advancement priority is equal to a sum of multiples of the first priority and the first priority offset.

In one embodiment, the first advancement priority is equal to a difference between multiples of the first priority and the first priority offset.

In one embodiment, the second priority is one of the Py first-type priorities.

In one embodiment, the second priority is a positive integer among Py positive integers.

In one embodiment, the second priority is a positive integer of 1 through Py.

In one embodiment, the second priority is assigned to the third bit block.

In one embodiment, the second radio signal is used to determine a second priority offset.

In one embodiment, the second priority offset comprises a positive decimal.

In one embodiment, the second priority offset comprises a positive integer.

In one embodiment, the second priority offset comprises a negative decimal.

In one embodiment, the second priority offset comprises a negative integer.

In one embodiment, the second radio signal is an initial transmission of the third bit block, with the second priority offset being 0.

In one embodiment, the second radio signal is a retransmission of the third bit block, with the second priority offset being a positive number.

In one embodiment, the second radio signal is a retransmission of the third bit block, with the second priority offset being a negative number.

In one embodiment, N retransmissions respectively correspond to N first-type priority offsets, and the second priority offset is one of the N first-type priority offsets.

In one embodiment, the second radio signal is an Ni-th retransmission of the third bit block, and the second priority offset is an Ni-th first-type priority offset of the N first-type priority offsets.

In one embodiment, the second radio signal is a (Ni+1)-th retransmission of the third bit block, and the second priority offset is an (Ni+1)-th first-type priority offset of the N first-type priority offsets.

In one embodiment, the second radio signal is an initial transmission of the third bit block, and the second advancement priority is equal to the second priority.

In one embodiment, the second radio signal is a retransmission of the third bit block, and the second advancement priority is greater than the second priority.

In one embodiment, the second radio signal is a retransmission of the third bit block, and the second advancement priority is smaller than the second priority.

In one embodiment, the second advancement priority comprises a non-negative integer.

In one embodiment, the second advancement priority comprises a decimal.

In one embodiment, the second advancement priority comprises a non-negative decimal.

In one embodiment, the second advancement priority is linear with the second priority.

In one embodiment, the second advancement priority is linear with the second priority and the second priority offset.

In one embodiment, the second advancement priority is equal to a sum of the second priority and the second priority offset.

In one embodiment, the second advancement priority is equal to a difference between the second priority and the second priority offset.

In one embodiment, the second advancement priority is equal to a sum of multiples of the second priority and the second priority offset.

In one embodiment, the second advancement priority is equal to a difference between multiples of the second priority and the second priority offset.

In one embodiment, the first threshold list is comprised of a positive integer number of first-type thresholds, and the first threshold is one of the positive integer number of first-type thresholds.

In one embodiment, the first threshold list comprises 64 first-type thresholds.

In one embodiment, the first threshold list comprises 67 first-type thresholds.

In one embodiment, the positive integer number of first-type thresholds in the first threshold list are sequentially arranged in an ascending order.

In one embodiment, the first threshold list comprises negative infinity dBm, . . . and −128 dBm, −126 dBm . . . , and positive infinity dBm.

In one embodiment, the first threshold list does not comprise negative infinity dBm or positive infinity dBm.

In one embodiment, the first threshold list comprises negative infinity dBm and positive infinity dBm.

In one embodiment, the first threshold list comprises non-positive integral values from −128 dBm to 0dBm.

In one embodiment, the first threshold list comprises even values from −128 dBm to 0dBm.

In one embodiment, the first threshold list is configured by a higher-layer signaling.

In one embodiment, there are a positive integer number of first-type threshold indexes respectively corresponding to the positive integer number of first-type thresholds comprised in the first threshold list, and any of the positive integer number of first-type threshold indexes is a positive integer.

In one embodiment, the first threshold index is a first-type threshold index among the positive integer number of first-type threshold indexes.

In one embodiment, the first threshold index is a positive integer.

In one embodiment, the first threshold index is a non-negative integer of 0 through 66.

In one embodiment, the first threshold index is a positive integer of 1 through 64.

In one embodiment, the first threshold index is a positive integer of 1 through 65.

In one embodiment, the first threshold index is one of the positive integer number of first-type threshold indexes that corresponds to the first threshold.

In one embodiment, the first threshold index is used to indicate the first threshold in the first threshold list.

In one embodiment, the first threshold index is linear with the first advancement priority and the second advancement priority.

In one embodiment, the first threshold index is a sum of a product of a second advancement priority and a first factor, a product of a first advancement priority and a second factor, and a first constant.

In one embodiment, the first factor is a positive integer.
In one embodiment, the first factor is equal to 8.
In one embodiment, the second factor is a positive integer.
In one embodiment, the second factor is equal to 1.
In one embodiment, the first constant is a positive integer.
In one embodiment, the first constant is equal to 1.
In one embodiment, the first threshold is measured in dBm.

In one embodiment, the first threshold is measured in dB.
In one embodiment, the first threshold is measured in W.
In one embodiment, the first threshold is measured in mW.
In one embodiment, the first threshold comprises an even value of −128 dBm through 0 dBm.

In one embodiment, the first threshold comprises negative infinity dBm.

In one embodiment, the first threshold comprises positive infinity dBm.

In one embodiment, the first threshold is equal to (−128+(q−1)*2) dBm, where q is the first threshold index, q being a positive integer greater than 0 and less than 66.

In one embodiment, the first threshold index is 0, and the first threshold is negative infinity dBm.

In one embodiment, the first threshold index is 66, and the first threshold is positive infinity dBm.

Embodiment 9

Figure 9:
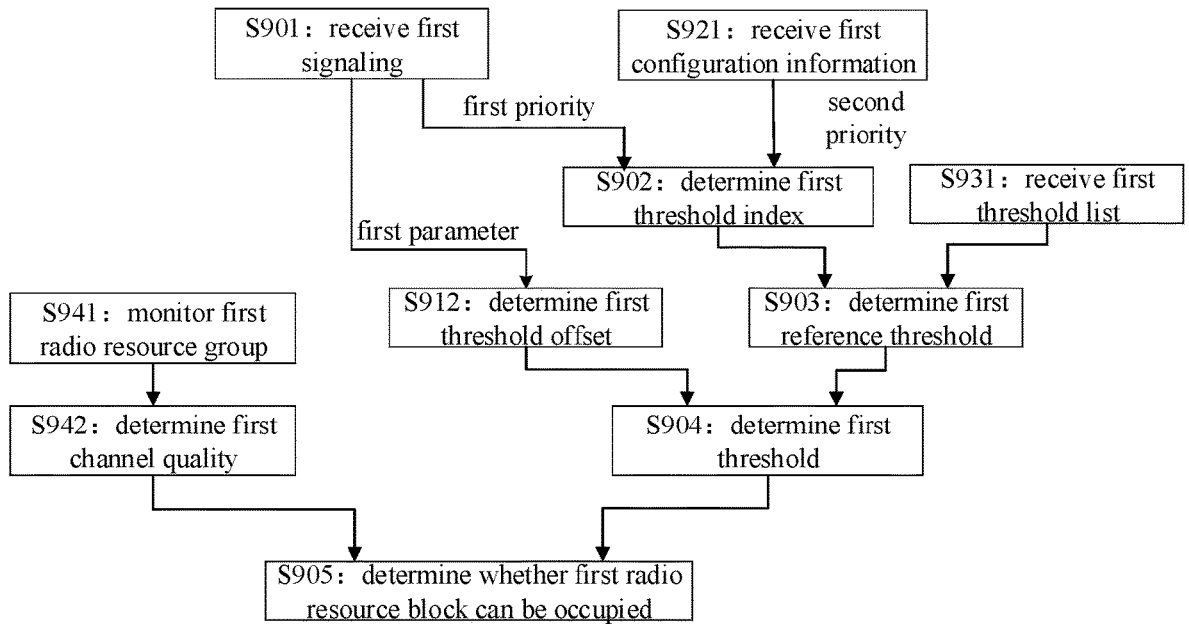
FIG. 9 illustrates a flowchart of determining whether a first radio resource block can be occupied according to one embodiment of the present disclosure.

Embodiment 9 illustrates a flowchart of determining whether a first radio resource block can be occupied according to one embodiment of the present disclosure, as shown in FIG. 9.

In Embodiment 9, receive a first signaling in step S901; and receives first configuration information in step S921; determine a first threshold index in step S902; receive a first threshold list in step S931; determine a first reference threshold in step S903; and determine a first threshold offset in step S912; determine a first threshold in step S904; monitor a first radio resource group in step S941; determine a first channel quality in step S942; and determine in step S905 whether the first radio resource block can be occupied; the first signaling comprises the first priority and the first parameter in the present disclosure; the first configuration information comprises the second priority in the present disclosure; the first priority and the second priority are jointly used to determine the first threshold index; the first threshold index and the first threshold list are jointly used to determine the first reference threshold; the first parameter is used to determine the first threshold offset; the first threshold offset and the first reference threshold are jointly used to determine the first threshold; monitoring the first radio resource group is used to determine the first channel quality; the first channel quality and the first threshold are jointly used to determine whether the first radio resource block can be occupied.

In one embodiment, the first threshold list is comprised of a positive integer number of first-type thresholds, and the first reference threshold is one of the positive integer number of first-type thresholds.

In one embodiment, the first threshold index is one of the positive integer number of first-type threshold indexes that corresponds to the first reference threshold.

In one embodiment, the first threshold index is used for indicating the first reference threshold in the first threshold list.

In one embodiment, the first priority and the second priority are jointly used to determine the first reference threshold.

In one embodiment, the first threshold index is linear with the first priority and the second priority.

In one embodiment, the first threshold index is a sum of a product of a second priority and a third factor, a product of a first priority and a fourth factor, and a second constant.

In one embodiment, the third factor is a positive integer.
In one embodiment, the third factor is equal to 8.
In one embodiment, the fourth factor is a positive integer.

In one embodiment, the fourth factor is equal to 1.

In one embodiment, the second constant is a positive integer.

In one embodiment, the second constant is equal to 1.

In one embodiment, the first threshold offset is measured in dBm.

In one embodiment, the first threshold offset is measured in dB.

In one embodiment, the first threshold offset is measured in W.

In one embodiment, the first threshold offset is measured in mW.

In one embodiment, the first threshold offset comprises a positive decimal.

In one embodiment, the first threshold offset comprises a positive integer.

In one embodiment, the first threshold offset comprises a negative decimal.

In one embodiment, the first threshold offset comprises a negative integer.

In one embodiment, the first threshold offset comprises 0.

In one embodiment, the first threshold offset comprises +2 dBm.

In one embodiment, the first threshold offset comprises −2 dBm.

In one embodiment, the first threshold offset comprises +1 dBm.

In one embodiment, the first threshold offset comprises −1 dBm.

In one embodiment, the first threshold offset comprises +0.5 dBm.

In one embodiment, the first threshold offset comprises −0.5 dBm.

In one embodiment, the first parameter is used to determine the first threshold offset.

In one embodiment, the first parameter indicates that the first radio resource block is reserved for an initial transmission, with the first threshold offset being 0.

In one embodiment, the first parameter indicates that the first radio resource block is reserved for a retransmission, with the first threshold offset being a positive integer.

In one embodiment, the first parameter indicates that the first radio resource block is reserved for a retransmission, with the first threshold offset being a negative integer.

In one embodiment, the first parameter indicates that the first radio resource block is reserved for a retransmission, with the first threshold offset being a positive decimal.

In one embodiment, the first parameter indicates the first radio resource block is reserved for a retransmission, with the first threshold offset being a negative decimal.

In one embodiment, the first parameter and the second radio signal are jointly used to determine the first threshold offset.

In one embodiment, the first parameter indicates that the first radio resource block is reserved for an initial transmission, and the second radio signal is an initial transmission of the third bit block, with the first threshold offset being 0.

In one embodiment, the first parameter indicates that the first radio resource block is reserved for a retransmission, and the second radio signal is a retransmission of the third bit block, with the first threshold offset being 0.

In one embodiment, the first parameter indicates that the first radio resource block is reserved for an initial transmission, and the second radio signal is a retransmission of the third bit block, with the first threshold offset being a positive number.

In one embodiment, the first parameter indicates that the first radio resource block is reserved for an initial transmission, and the second radio signal is a retransmission of the third bit block, with the first threshold offset being a negative number.

In one embodiment, the first parameter indicates that the first radio resource block is reserved for a retransmission, and the second radio signal is an initial transmission of the third bit block, with the first threshold offset being a positive number.

In one embodiment, the first parameter indicates that the first radio resource block is reserved for a retransmission, and the second radio signal is an initial transmission of the third bit block, with the first threshold offset being a negative number.

In one embodiment, N retransmissions respectively correspond to N first-type threshold offsets, and the first threshold offset is one of the N first-type threshold offsets.

In one embodiment, any of the N first-type threshold offsets is a positive decimal.

In one embodiment, any of the N first-type threshold offsets is a negative decimal.

In one embodiment, any of the N first-type threshold offsets is a positive integer.

In one embodiment, any of the N first-type threshold offsets is a negative integer.

In one embodiment, an Ni-th retransmission is one of the N retransmissions, and an Ni-th first-type threshold offset is one of the N first-type threshold offsets that corresponds to the Ni-th retransmission, Ni being a positive integer greater than 0 and less than N.

In one embodiment, a (Ni+1)-th first-type threshold offset is one of the N first-type threshold offsets that corresponds to the (Ni+1)-th retransmission, where the (Ni+1)-th first-type threshold offset is larger than the Ni-th first-type threshold offset.

In one embodiment, a (Ni+1)-th first-type threshold offset is one of the N first-type threshold offsets that corresponds to the (Ni+1)-th retransmission, where the (Ni+1)-th first-type threshold offset is smaller than the Ni-th first-type threshold offset.

In one embodiment, the first parameter indicates that the first radio resource block is reserved for the Ni-th retransmission, and the second radio signal is an initial transmission of the third bit block, where the first threshold offset is an Ni-th first-type threshold offset of the N first-type threshold offsets.

In one embodiment, the first parameter indicates that the first radio resource block is reserved for the (Ni+1)-th retransmission, and the second radio signal is an initial transmission of the third bit block, where the first threshold offset is an (Ni+1)-th first-type threshold offset of the N first-type threshold offsets.

In one embodiment, the first radio signal is an Ni-th retransmission of the first bit block, and the second radio signal is an initial transmission of the third bit block, with the first threshold being an Ni-th first-type threshold offset of the N first-type threshold offsets.

In one embodiment, the first radio signal is a (Ni+1)-th retransmission of the first bit block, and the second radio signal is an initial transmission of the third bit block, with the first threshold being a (Ni+1)-th first-type threshold offset of the N first-type threshold offsets.

In one embodiment, the first parameter indicates that the first radio resource block is reserved for an initial transmission, and the second radio signal is an initial transmission of the third bit block, with the first threshold being equal to the first reference threshold.

In one embodiment, the first parameter indicates that the first radio resource block is reserved for a retransmission, and the second radio signal is an initial transmission of the third bit block, with the first threshold being greater than the first reference threshold.

In one embodiment, the first parameter indicates that the first radio resource block is reserved for a retransmission, and the second radio signal is an initial transmission of the third bit block, with the first threshold being less than the first reference threshold.

In one embodiment, the first parameter indicates that the first radio resource block is reserved for an initial transmission, and the second radio signal is a retransmission of the third bit block, with the first threshold being greater than the first reference threshold.

In one embodiment, the first parameter indicates that the first radio resource block is reserved for an initial transmission, and the second radio signal is a retransmission of the third bit block, with the first threshold being less than the first reference threshold.

In one embodiment, the first parameter indicates that the first radio resource block is reserved for a retransmission, and the second radio signal is a retransmission of the third bit block, with the first threshold being equal to the first reference threshold.

In one embodiment, the first radio signal is an initial transmission of the first bit block, and the second radio signal is an initial transmission of the third bit block, with the first threshold being equal to the first reference threshold.

In one embodiment, the first radio signal is a retransmission of the first bit block, and the second radio signal is an initial transmission of the third bit block, with the first threshold being greater than the first reference threshold.

In one embodiment, the first radio signal is a retransmission of the first bit block, and the second radio signal is an initial transmission of the third bit block, with the first threshold being less than the first reference threshold.

In one embodiment, the first radio signal is an initial transmission of the first bit block, and the second radio signal is a retransmission of the third bit block, with the first threshold being greater than the first reference threshold.

In one embodiment, the first radio signal is an initial transmission of the first bit block, and the second radio signal is a retransmission of the third bit block, with the first threshold being less than the first reference threshold.

In one embodiment, the first radio signal is a retransmission of the first bit block, and the second radio signal is a retransmission of the third bit block, with the first threshold being equal to the first reference threshold.

In one embodiment, the first threshold is linear with the first reference threshold.

In one embodiment, the first threshold is linear with the first reference threshold and the first threshold offset.

In one embodiment, the first threshold is equal to a sum of the first reference threshold and the first threshold offset.

In one embodiment, the first threshold is equal to a difference between the first reference threshold and the first threshold offset.

In one embodiment, the first threshold is equal to a sum of multiples of the first reference threshold and the first threshold offset.

In one embodiment, the first threshold is equal to a difference between multiples of the first reference threshold and the first threshold offset.

Embodiment 10

Figure 10:
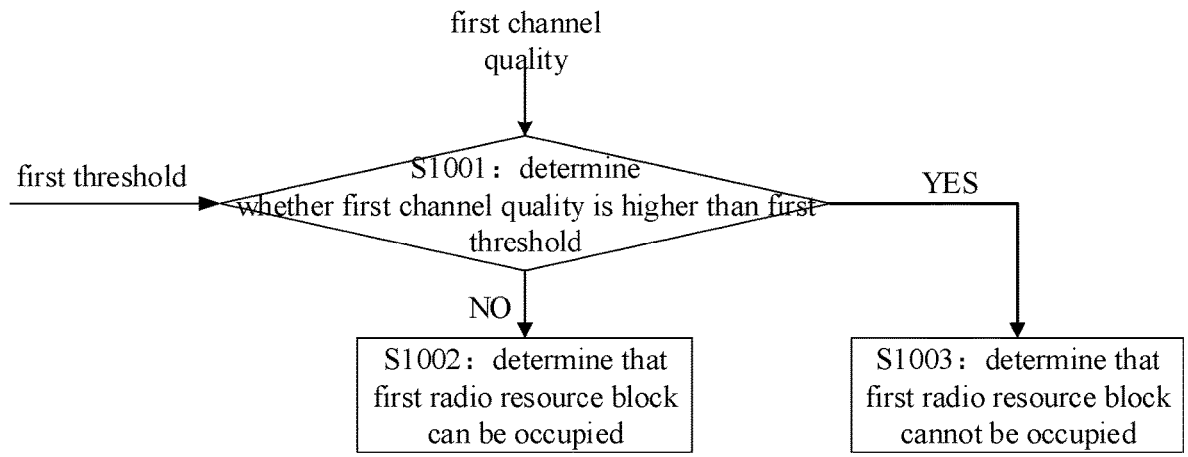
FIG. 10 illustrates a flowchart of determining whether a first radio resource block can be occupied according to one embodiment of the present disclosure.

Embodiment 10 illustrates a flowchart of determining whether a first radio resource block can be occupied according to one embodiment of the present disclosure, as shown in FIG. 10.

In Embodiment 10, determine whether a first channel quality is higher than a first threshold in step S1001; when a result of determining whether the first channel quality is higher than the first threshold is "NO", perform step S1002 to determine that a first radio resource block can be occupied; when a result of determining whether the first channel quality is higher than the first threshold is "YES", perform step S1003 to determine that a first radio resource block cannot be occupied.

In one embodiment, the first threshold is used to determine whether the first radio resource block can be occupied.

In one embodiment, the first threshold and the first channel quality are jointly used to determine whether the first radio resource block can be occupied.

In one embodiment, the first channel quality is no lower than the first threshold, and the first radio resource block cannot be occupied.

In one embodiment, the first channel quality is higher than the first threshold, and the first radio resource block cannot be occupied.

In one embodiment, the first channel quality is equal to the first threshold, and the first radio resource block cannot be occupied.

In one embodiment, the first channel quality is no higher than the first threshold, and the first radio resource block can be occupied.

In one embodiment, the first channel quality is lower than the first threshold, and the first radio resource block can be occupied.

In one embodiment, the first channel quality is equal to the first threshold, and the first radio resource block can be occupied.

In one embodiment, the first channel quality is no lower than the first threshold, and the result of determining whether a first channel quality is higher than a first threshold is "YES".

In one embodiment, the first channel quality is higher than the first threshold, and the result of determining whether a first channel quality is higher than a first threshold is "YES".

In one embodiment, the first channel quality is equal to the first threshold, and the result of determining whether a first channel quality is higher than a first threshold is "YES".

In one embodiment, the first channel quality is no higher than the first threshold, and the result of determining whether a first channel quality is higher than a first threshold is "NO".

In one embodiment, the first channel quality is lower than the first threshold, and the result of determining whether a first channel quality is higher than a first threshold is "NO".

In one embodiment, the first channel quality is equal to the first threshold, and the result of determining whether a first channel quality is higher than a first threshold is "NO".

In one embodiment, the first radio resource block can be occupied, and the first radio resource block can be used for transmitting the second radio signal.

In one embodiment, the first radio resource block cannot be occupied, and the first radio resource block cannot be used for transmitting the second radio signal.

In one embodiment, the first radio resource block can be occupied, and the second radio signal is transmitted in the first radio resource block.

In one embodiment, the first radio resource block cannot be occupied, and transmitting the second radio signal in the first radio resource block is dropped.

In one embodiment, the first radio resource block can be occupied, and the first radio resource block can be used for transmitting the third bit block.

In one embodiment, the first radio resource block cannot be occupied, and the first radio resource block cannot be used for transmitting the third bit block.

In one embodiment, the first radio resource block can be occupied, and the third bit block is transmitted in the first radio resource block.

In one embodiment, the first radio resource block cannot be occupied, and transmitting the third bit block in the first radio resource block is dropped.

Embodiment 11

Figure 11:
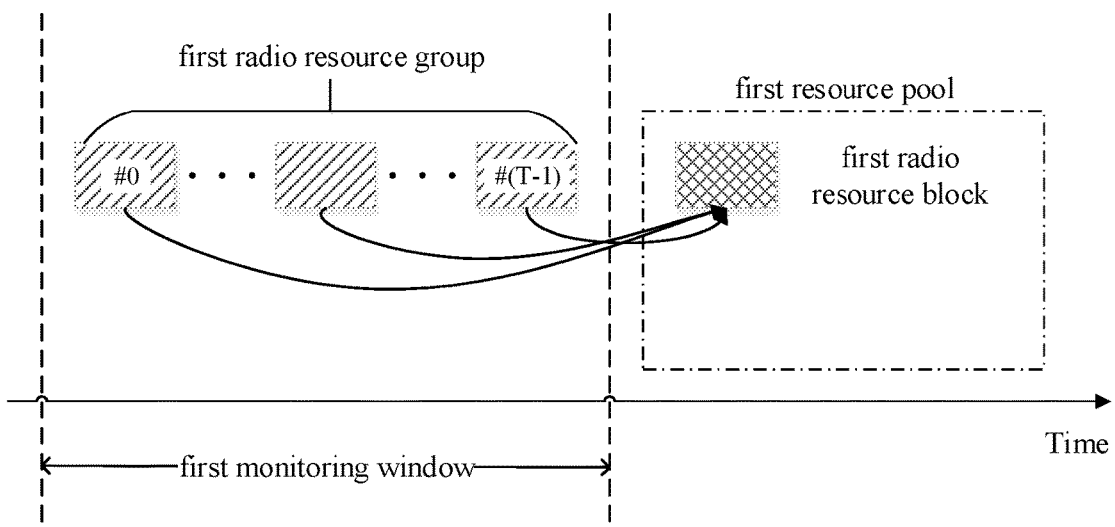
FIG. 11 illustrates a schematic diagram of relations among a first radio resource group, a first radio resource block and a first resource pool according to one embodiment of the present disclosure.

Embodiment 11 illustrates a schematic diagram of relations among a first radio resource group, a first radio resource block and a first resource pool according to one embodiment of the present disclosure, as shown in FIG. 11. In FIG. 11, the broken-line framed box represents a first resource pool, rectangles filled with slashes represent a first radio resource group, and the rectangle filled with oblique grids represents a first radio resource block.

In Embodiment 11, the first node monitors a first radio resource group in a first monitoring window to acquire a first channel quality; the first radio resource group is associated with the first radio resource block; the first channel quality and the first threshold are used to determine whether the first radio resource block belongs to a first resource pool.

In one embodiment, the first monitoring window comprises a positive integer number of time-domain resource unit(s).

In one embodiment, the first monitoring window comprises a positive integer number of slot(s).

In one embodiment, the first monitoring window comprises a positive integer number of subframe(s).

In one embodiment, the first monitoring window comprises a positive integer number of millisecond(s).

In one embodiment, the first monitoring window is earlier than the first radio resource block.

In one embodiment, the first radio resource group comprises T first-type radio resource blocks, and the first radio resource group belongs to the first monitoring window, T being a positive integer.

In one embodiment, any first-type radio resource block of the T first-type radio resource blocks comprised in the first radio resource group is comprised of a positive integer number of time-frequency resource unit(s).

In one embodiment, T is a multiple of 10.

In one embodiment, any of the T first-type radio resource blocks comprises a PSSCH.

In one embodiment, any of the T first-type radio resource blocks comprises a PSCCH.

In one embodiment, any of the T first-type radio resource blocks comprises a PSCCH and a PSSCH.

In one embodiment, the first radio resource group is associated with the first radio resource block.

In one embodiment, each of the T first-type radio resource blocks comprised in the first radio resource group is associated with the first radio resource block.

In one embodiment, the first radio resource group is earlier than the first radio resource block in time domain.

In one embodiment, time intervals respectively between the T first-type radio resource blocks comprised in the first radio resource group and the first radio resource block are proportional.

In one embodiment, a frequency-domain resource unit occupied by any of the T first-type radio resource blocks comprised in the first radio resource group is overlapping with a frequency-domain resource unit occupied by the first radio resource block.

In one embodiment, a frequency-domain resource unit occupied by any of the T first-type radio resource blocks comprised in the first radio resource group is the same as a frequency-domain resource unit occupied by the first radio resource block.

In one embodiment, T first-type sub-signalings are respectively transmitted on the T first-type radio resource blocks comprised in the first radio resource group.

In one embodiment, T first-type reference signals are respectively transmitted on the T first-type radio resource blocks comprised in the first radio resource group.

In one embodiment, monitoring the first radio resource group comprises monitoring the T first-type sub-signalings in the first monitoring window.

In one embodiment, monitoring the first radio resource group comprises monitoring the T first-type reference signals in the first monitoring window.

In one embodiment, monitoring the first radio resource group comprises monitoring a first target sub-signaling in the first monitoring window, the first target sub-signaling being a first-type sub-signaling of the T first-type sub-signalings.

In one embodiment, monitoring the first radio resource group comprises monitoring a first target reference signal in the first monitoring window, the first target reference signal being a first-type reference signal of the T first-type reference signals.

In one embodiment, monitoring the first radio resource group comprises monitoring all the T first-type sub-signalings in the first monitoring window, the first target sub-signaling being a first-type sub-signaling of the T first-type sub-signalings.

In one embodiment, monitoring the first radio resource group comprises monitoring all the T first-type reference signals in the first monitoring window, the first target reference signal being a first-type reference signal of the T first-type reference signals.

In one embodiment, the monitoring comprises reception based on blind detection, namely, the first node receives a signal in the first monitoring window and performs decoding operation, when the decoding is determined to be correct according to a CRC bit, it is determined that the first target sub-signaling is correctly received in the first monitoring window; otherwise, it is determined that the first target sub-signaling is not correctly received in the first monitoring window.

In one embodiment, the first target sub-signaling comprises SCI.

In one embodiment, the monitoring comprises reception based on coherent detection, namely, the first node performs coherent reception on a radio signal using an RS sequence corresponding to the first target reference signal in the first monitoring window, and then measures energy of a signal obtained by the coherent reception; when the energy of the signal obtained by the coherent reception is greater than a first given threshold, it is then determined that the first target reference signal is correctly received in the first monitoring window; otherwise, it is determined that the first target reference signal is not correctly received in the first monitoring window.

In one embodiment, the first target reference signal comprises a DMRS.

In one embodiment, the first target reference signal comprises a CSI-RS.

In one embodiment, the monitoring comprises reception based on energy detection, namely, the first node senses energy of a radio signal in the first monitoring window and averages in time to acquire a received energy; when the received energy is greater than a second given threshold, it is determined that the first target reference signal is correctly received in the first monitoring window; otherwise, it is determined that the first target reference signal is not correctly received in the first monitoring window.

In one embodiment, the monitoring comprises signaling-based energy detection, namely, the first node receives the first target sub-signaling in the first monitoring window, and, when the first target sub-signaling is correctly received, senses energy of the first target reference signal, and averages in frequency domain to obtain a first channel quality.

In one embodiment, the monitoring comprises signaling-based energy detection, namely, the first node receives the first target sub-signaling in the first monitoring window, and, when the first target sub-signaling is correctly received, senses energy of the first target reference signal, and averages in time domain to obtain a first channel quality.

In one embodiment, the monitoring comprises signaling-based energy detection, namely, the first node receives the first target sub-signaling in the first monitoring window, and, when the first target sub-signaling is correctly received, senses energy of the first target reference signal, and averages in frequency domain to obtain a first channel quality.

In one embodiment, the monitoring comprises signaling-based energy detection, namely, the first node receives the T first-type sub-signalings in the first monitoring window, and, when the T first-type sub-signalings are correctly received, senses energies of the T first-type reference signals, and averages in time domain to obtain a first channel quality.

In one embodiment, the monitoring comprises signaling-based energy detection, namely, the first node receives the T first-type sub-signalings in the first monitoring window, and, when the T first-type sub-signalings are correctly received, senses energies of the T first-type reference signals, and filters in Layer 1 to obtain a first channel quality.

In one embodiment, the monitoring comprises signaling-based energy detection, namely, the first node receives the T first-type sub-signalings in the first monitoring window, and, when the T first-type sub-signalings are correctly received, senses energies of the T first-type reference signals, and filters in Layer 3 to obtain a first channel quality.

In one embodiment, the first channel quality comprises a Reference Signal Receiving Power (RSRP).

In one embodiment, the first channel quality comprises a Received Signal Strength Indication (RSSI).

In one embodiment, the first channel quality comprises a Reference Signal Receiving Quality (RSRQ).

In one embodiment, the first channel quality comprises a Signal to Noise Ratio (SNR).

In one embodiment, the first channel quality comprises a Signal to Interference plus Noise Ratio (SINR).

In one embodiment, the first channel quality comprises a L1-RSRP.

In one embodiment, the first channel quality comprises a L3-RSRP.

In one embodiment, the first channel quality comprises a SL-RSRP.

In one embodiment, the first channel quality comprises a PSSCH-RSRP.

In one embodiment, the first channel quality comprises a PSCCH-RSRP.

In one embodiment, the first channel quality is measured in dBm.

In one embodiment, the first channel quality is measured in dB.

In one embodiment, the first channel quality is measured in W.

In one embodiment, the first channel quality is measured in mW.

In one embodiment, the first resource pool comprises a positive integer number of second-type radio resource block(s).

In one embodiment, any of the positive integer number of second-type radio resource block(s) comprised in the first resource pool is comprised of a positive integer number of time-frequency resource unit(s).

In one embodiment, the first radio resource block is a second-type radio resource block of a positive integer number of second-type radio resource block(s) comprised in the first resource pool.

In one embodiment, the first radio resource block is not any second-type radio resource block of a positive integer number of second-type radio resource block(s) comprised in the first resource pool.

In one embodiment, when it is determined that the first radio resource block can be occupied, the first resource pool comprises the first radio resource block.

In one embodiment, when it is determined that the first radio resource block cannot be occupied, the first resource pool does not comprise the first radio resource block.

In one embodiment, when it is determined that the first radio resource block can be occupied, the first radio resource block belongs to the first resource pool.

In one embodiment, when it is determined that the first radio resource block cannot be occupied, the first radio resource block does not belong to the first resource pool.

In one embodiment, when it is determined that the first radio resource block can be occupied, the first radio resource block is retained in the first resource pool.

In one embodiment, when it is determined that the first radio resource block cannot be occupied, the first radio resource block is removed from the first resource pool.

In one embodiment, the first node transmits the second radio signal on a first target radio resource block, the first target radio resource block being one of the positive integer number of second-type radio resource block(s) comprised in the first resource pool.

In one embodiment, the second target radio resource block and the first radio resource block are overlapping.

In one embodiment, the second target radio resource block and the first radio resource block are orthogonal.

In one embodiment, the second target radio resource block comprises the first radio resource block.

In one embodiment, the second target radio resource block does not comprise the first radio resource block.

In one embodiment, the first node autonomously selects the first target radio resource block from the first resource pool.

In one embodiment, the first node autonomously determines the first target radio resource block in the first resource pool.

In one embodiment, the first node is configured with the first target radio resource block.

Embodiment 12

Figure 12:
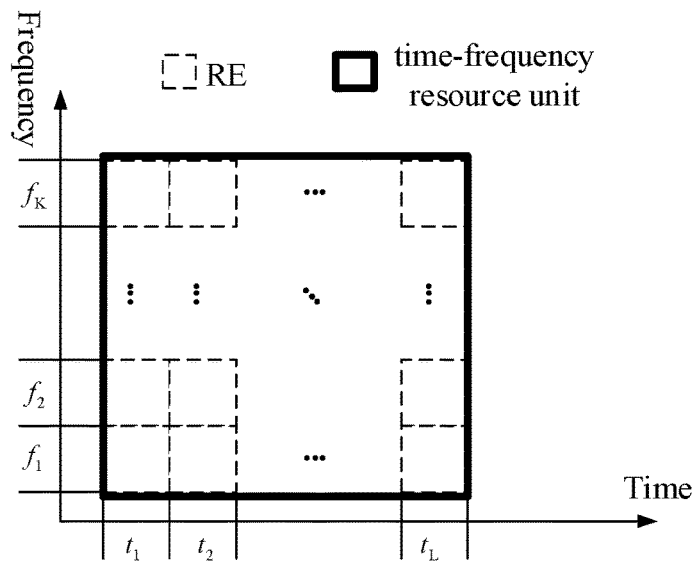
FIG. 12 illustrates a schematic diagram of a time-frequency resource unit according to one embodiment of the present disclosure.

Embodiment 12 illustrates a schematic diagram of a time-frequency resource unit according to one embodiment of the present disclosure, as shown in FIG. 12. In FIG. 12, each small box framed with broken lines represents a Resource Element (RE), the large thick-line box represents a time-frequency resource unit. In FIG. 12, a time-frequency resource unit occupies K subcarriers in frequency domain and L multicarrier symbol(s) in time domain, where K and L are positive integers. In FIG. 12, $t_1$, $t_2$ ... and $t_L$ represent L Symbol(s), and $f_1$, $f_2$ ... and $f_K$ represent the K Subcarriers.

In Embodiment 12, a time-frequency resource unit occupies the K subcarriers in frequency domain, and the L multicarrier symbols in time domain, where K and L are both positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is no greater than 14.

In one embodiment, any of the L multicarrier symbol(s) is a Frequency Division Multiple Access (FDMA) symbol.

In one embodiment, any of the L multicarrier symbol(s) is an Orthogonal Frequency Division Multiplexing (OFDM) symbol.

In one embodiment, any of the L multicarrier symbol(s) is a Single-Carrier Frequency Division Multiple Access (SC-FDMA) symbol.

In one embodiment, any of the L multicarrier symbol(s) is a Discrete Fourier Transform Spread Orthogonal Frequency Division Multiplexing (DFT-S-OFDM) symbol.

In one embodiment, any of the L multicarrier symbol(s) is a Filter Bank Multi-Carrier (FBMC) symbol.

In one embodiment, any of the L multicarrier symbol(s) is an Interleaved Frequency Division Multiple Access (IF-DMA) symbol.

In one embodiment, the time-domain resource unit comprises a positive integer number of radio frame(s).

In one embodiment, the time-domain resource unit comprises a positive integer number of subframe(s).

In one embodiment, the time-domain resource unit comprises a positive integer number of slot(s).

In one embodiment, the time-domain resource unit is a slot.

In one embodiment, the time-domain resource unit comprises a positive integer number of multicarrier symbol(s).

In one embodiment, the frequency-domain resource unit comprises a positive integer number of carrier(s).

In one embodiment, the frequency-domain resource unit comprises a positive integer number of Bandwidth Part(s) (BWP(s)).

In one embodiment, the frequency-domain resource unit is a BWP.

In one embodiment, the frequency-domain resource unit comprises a positive integer number of subchannel(s).

In one embodiment, the frequency-domain resource unit is a subchannel.

In one embodiment, any of the positive integer number of subchannel(s) comprises a positive integer number of Resource Block(s) (RB(s)).

In one embodiment, the subchannel comprises a positive integer number of RB(s).

In one embodiment, any of the positive integer number of RB(s) comprises a positive integer number of subcarrier(s) in frequency domain.

In one embodiment, any of the positive integer number of RB(s) comprises 12 subcarriers in frequency domain.

In one embodiment, the subchannel comprises a positive integer number of Physical Resource Block(s) (PRB(s)).

In one embodiment, the number of PRB(s) comprised in the subchannel is variable.

In one embodiment, any of the positive integer number of PRB(s) comprises a positive integer number of subcarrier(s) in frequency domain.

In one embodiment, any of the positive integer number of PRB(s) comprises 12 subcarriers in frequency domain.

In one embodiment, the frequency-domain resource unit comprises a positive integer number of RB(s).

In one embodiment, the frequency-domain resource unit is an RB.

In one embodiment, the frequency-domain resource unit comprises a positive integer number of PRB(s).

In one embodiment, the frequency-domain resource unit is a PRB.

In one embodiment, the frequency-domain resource unit comprises a positive integer number of subcarrier(s).

In one embodiment, the frequency-domain resource unit is a subcarrier.

In one embodiment, the time-frequency resource unit comprises the time-domain resource unit.

In one embodiment, the time-frequency resource unit comprises the frequency-domain resource unit.

In one embodiment, the time-frequency resource unit comprises the time-domain resource unit and the frequency-domain resource unit.

In one embodiment, the time-frequency resource unit comprises R RE(s), R being a positive integer.

In one embodiment, the time-frequency resource unit consists of R RE(s), R being a positive integer.

In one embodiment, any of the R RE(s) occupies a multicarrier symbol in time domain and a subcarrier in frequency domain.

In one embodiment, the subcarrier spacing is measured in Hertz (Hz).

In one embodiment, the subcarrier spacing is measured in Kilohertz (kHz).

In one embodiment, the subcarrier spacing is measured in Megahertz (MHz).

In one embodiment, a symbol length of the multicarrier symbol is measured in sampling points.

In one embodiment, a symbol length of the multicarrier symbol is measured in microseconds (μs).

In one embodiment, a symbol length of the multicarrier symbol is measured in milliseconds (ms).

In one embodiment, the subcarrier spacing is at least one of 1.25 kHz, 2.5 kHz, 5 kHz, 15 kHz, 30 kHz, 60 kHz, 120 kHz or 240 kHz.

In one embodiment, the time-frequency resource unit comprises the K subcarriers and the L multicarrier symbol(s), where a product of the K and the L is no less than the R.

In one embodiment, the time-frequency resource unit does not comprise any RE allocated to a Guard Period (GP).

In one embodiment, the time-frequency resource unit does not comprise any RE allocated to a Reference Signal (RS).

In one embodiment, the time-frequency resource unit comprises a positive integer number of RB(s).

In one embodiment, the time-frequency resource unit belongs to an RB.

In one embodiment, the time-frequency resource unit is equivalent to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equivalent to a PRB in frequency domain.

In one embodiment, the time-frequency resource unit comprises a positive integer number of Virtual Resource Block(s) (VRB(s)).

In one embodiment, the time-frequency resource unit belongs to a VRB.

In one embodiment, the time-frequency resource unit is equivalent to a VRB in frequency domain.

In one embodiment, the time-frequency resource unit comprises a positive integer number of PRB pair(s).

In one embodiment, the time-frequency resource unit belongs to a PRB pair.

In one embodiment, the time-frequency resource unit is equivalent to a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is equivalent to a radio frame in time domain.

In one embodiment, the time-frequency resource unit a positive integer number of subframe(s).

In one embodiment, the time-frequency resource unit belongs to a subframe.

In one embodiment, the time-frequency resource unit is equivalent to a subframe in time domain.

In one embodiment, the time-frequency resource unit a positive integer number of slot(s).

In one embodiment, the time-frequency resource unit belongs to a slot.

In one embodiment, the time-frequency resource unit is equivalent to a slot in time domain.

In one embodiment, the time-frequency resource unit a positive integer number of symbol(s).

In one embodiment, the time-frequency resource unit belongs to a symbol.

In one embodiment, the time-frequency resource unit is equivalent to a symbol in time domain.

In one embodiment, duration time of the time-domain resource unit in the present disclosure is equal to duration time of the time-frequency resource unit in the present disclosure in time domain.

In one embodiment, a number of subcarriers occupied by the frequency-domain resource unit in the present disclosure is equal to a number of subcarriers occupied by the time-frequency resource unit in the present disclosure in frequency domain.

Embodiment 13

Figure 13:
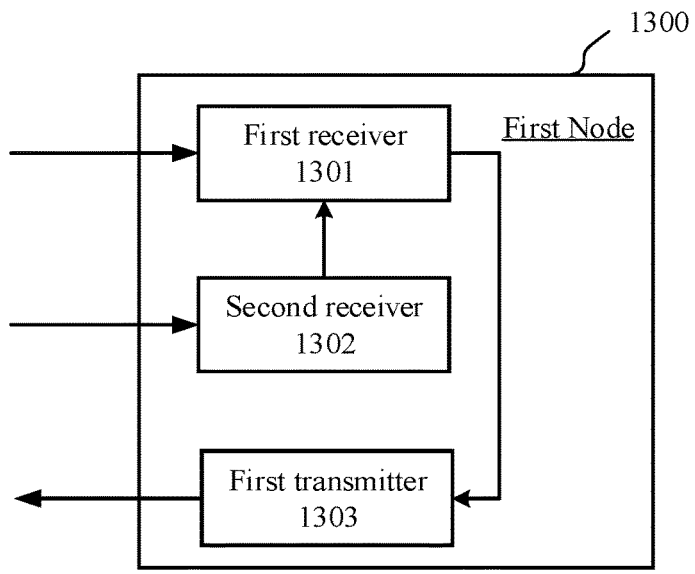
FIG. 13 illustrates a structure block diagram of a processing device used in a first node according to one embodiment of the present disclosure.

Embodiment 13 illustrates a structure block diagram of a processing device used in a first node, as shown in FIG. 13.

In Embodiment 13, a first node's processing device 1300 is mainly composed of a first receiver 1301, a second receiver 1302 and a first transmitter 1303.

In one embodiment, the first receiver 1301 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second receiver 1302 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1303 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 13, the first receiver 1301 receives a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, the first receiver 1301 determines a first advancement priority; the first advancement priority is linear with the first priority and a first priority offset; the first parameter is used to determine the first priority offset; the first advancement priority is used to determine a first threshold.

In one embodiment, the first receiver 1301 determines a first threshold offset; the first threshold is linear with a first reference threshold and a first threshold offset; the first priority is used to determine the first reference threshold, and the first parameter is used to determine the first threshold offset.

In one embodiment, the second receiver 1302 receives first configuration information, the first configuration information being used to indicate a second priority; the first priority and the second priority are jointly used to determine the first threshold; the first threshold is used to determine whether the first radio resource block can be occupied.

In one embodiment, when the first radio resource block can be occupied, the first transmitter 1303 transmits a second radio signal on the first radio resource block.

In one embodiment, the first node 1300 is a UE.

In one embodiment, the first node 1300 is a relay node.

In one embodiment, the first node 1300 is a base station.

In one embodiment, the first node 1300 is a piece of vehicle-mounted communication equipment.

In one embodiment, the first node 1300 is a UE supporting V2X communications.

In one embodiment, the first node 1300 is a relay node supporting V2X communications.

Embodiment 14

Figure 14:
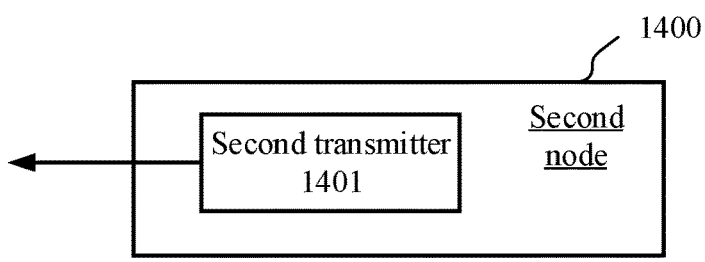
FIG. 14 illustrates a structure block diagram of a processing device used in a second node according to one embodiment of the present disclosure.

Embodiment 14 illustrates a structure block diagram of a processing device used in a second node, as shown in FIG. 14. In FIG. 14, a second node's processing device 1400 is composed of a second transmitter 1401.

In one embodiment, the second transmitter 1401 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the second transmitter 1401 transmits a first signaling; the first signaling is used to indicate a first priority, a first parameter and a first radio resource block; the first parameter is used to indicate whether the first radio resource block is to be reserved for an initial transmission; and the first priority and the first parameter are jointly used to determine whether the first radio resource block can be occupied.

In one embodiment, a first advancement priority is used to determine a first threshold; the first advancement is linear with the first priority and the first priority offset; the first parameter is used to determine the first priority offset.

In one embodiment, a first threshold is linear with a first reference threshold and a first threshold offset; the first priority is used to determine the first reference threshold; the first parameter is used to determine the first threshold offset.

In one embodiment, the first priority and the second priority are jointly used to determine the first threshold; the first threshold is used to determine whether the first radio resource block can be occupied; the second priority is indicated by first configuration information.

In one embodiment, the second transmitter 1401 transmits a first radio signal on the first radio resource block; a first bit block is used to generate the first radio signal; the first parameter indicates whether the first radio signal is an initial transmission of the first bit block.

In one embodiment, the second node 1400 is a UE.

In one embodiment, the second node 1400 is a base station.

In one embodiment, the second node 1400 is a relay node.

In one embodiment, the second node 1400 is a UE supporting V2X communications.

In one embodiment, the second node 1400 is base station supporting V2X communications.

In one embodiment, the second node 1400 is a relay node supporting V2X communications.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A method in a first node for wireless communications, comprising:
   receiving a first signaling, the first signaling being used to indicate a first priority, a first parameter and a first radio resource block;
   determining a first advancement priority;
   wherein the first parameter is used to indicate whether the first radio resource block is to be reserved for an initial transmission, and the first priority and the first parameter are jointly used to determine whether the first radio resource block can be occupied by the first node; the first advancement priority is linear with the first priority and a first priority offset; the first parameter is used to determine the first priority offset; the first advancement priority is used to determine a first threshold.

2. The method according to claim 1, comprising:
   determining a first threshold offset;
   wherein the first threshold is linear with a first reference threshold and a first threshold offset; the first priority is used to determine the first reference threshold, and the first parameter is used to determine the first threshold offset.

3. The method according to claim 1, comprising:
   receiving first configuration information, the first configuration information being used to indicate a second priority; wherein the first priority and the second priority are jointly used to determine the first threshold; the first threshold is used to determine whether the first radio resource block can be occupied.

4. The method according to claim 2, comprising:
   receiving first configuration information, the first configuration information being used to indicate a second priority;
   wherein the first priority and the second priority are jointly used to determine the first threshold; the first threshold is used to determine whether the first radio resource block can be occupied.

5. The method according to claim 3, comprising:
   transmitting a second radio signal on the first radio resource block in cases when the first radio resource block can be occupied.

6. A method in a second node for wireless communications, comprising:
   transmitting a first signaling, the first signaling being used to indicate a first priority, a first parameter and a first radio resource block;
   a first advancement priority is used to determine a first threshold;
   wherein the first parameter is used to indicate whether the first radio resource block is to be reserved for an initial transmission, and the first priority and the first parameter are jointly used to determine whether the first radio resource block can be occupied by a receiver of the first signaling; the first advancement is linear with the first priority and the first priority offset; the first parameter is used to determine the first priority offset;

or, wherein a first threshold is linear with a first reference threshold and a first threshold offset; the first priority is used to determine the first reference threshold; the first parameter is used to determine the first threshold offset.

7. The method according to claim 6, wherein the first priority and the second priority are jointly used to determine the first threshold; the first threshold is used to determine whether the first radio resource block can be occupied; the second priority is indicated by first configuration information.

8. The method according to claim 6, comprising: transmitting a first radio signal on the first radio resource block; wherein a first bit block is used to generate the first radio signal; the first parameter indicates whether the first radio signal is an initial transmission of the first bit block.

9. A first node for wireless communications, comprising:
a first receiver, receiving a first signaling, the first signaling being used to indicate a first priority, a first parameter and a first radio resource block;
the first receiver, determining a first advancement priority;
wherein the first parameter is used to indicate whether the first radio resource block is to be reserved for an initial transmission, and the first priority and the first parameter are jointly used to determine whether the first radio resource block can be occupied by the first node; the first advancement priority is linear with the first priority and a first priority offset; the first parameter is used to determine the first priority offset; the first advancement priority is used to determine a first threshold.

10. The first node according to claim 9, comprising:
the first receiver, determining a first threshold offset;
wherein the first threshold is linear with a first reference threshold and a first threshold offset; the first priority is used to determine the first reference threshold, and the first parameter is used to determine the first threshold offset.

11. The first node according to claim 9, comprising: a second receiver, receiving first configuration information, the first configuration information being used to indicate a second priority; wherein the first priority and the second priority are jointly used to determine the first threshold; the first threshold is used to determine whether the first radio resource block can be occupied.

12. The first node according to claim 10, comprising:
a second receiver, receiving first configuration information, the first configuration information being used to indicate a second priority;
wherein the first priority and the second priority are jointly used to determine the first threshold; the first threshold is used to determine whether the first radio resource block can be occupied.

13. The first node according to claim 12, comprising:
a first transmitter, transmitting a second radio signal on the first radio resource block in cases when the first radio resource block can be occupied.

14. A second node for wireless communications, comprising:
a second transmitter, transmitting a first signaling, the first signaling being used to indicate a first priority, a first parameter and a first radio resource block;
a first advancement priority is used to determine a first threshold;
wherein the first parameter is used to indicate whether the first radio resource block is to be reserved for an initial transmission, and the first priority and the first parameter are jointly used to determine whether the first radio resource block can be occupied by a receiver of the first signaling; the first advancement is linear with the first priority and the first priority offset; the first parameter is used to determine the first priority offset;
or, wherein a first threshold is linear with a first reference threshold and a first threshold offset; the first priority is used to determine the first reference threshold; the first parameter is used to determine the first threshold offset.

15. The second node according to claim 14, wherein the first priority and the second priority are jointly used to determine the first threshold; the first threshold is used to determine whether the first radio resource block can be occupied; the second priority is indicated by first configuration information.

16. The second node according to claim 15, comprising:
the second transmitter, transmitting a first radio signal on the first radio resource block;
wherein a first bit block is used to generate the first radio signal; the first parameter indicates whether the first radio signal is an initial transmission of the first bit block.

\* \* \* \* \*